(12) United States Patent
Friesen et al.

(10) Patent No.: US 10,090,520 B2
(45) Date of Patent: Oct. 2, 2018

(54) ALUMINUM-BASED METAL-AIR BATTERIES

(71) Applicant: Arizona Board of Regents Acting For And on Behalf of Arizona State University, Tempe, AZ (US)

(72) Inventors: Cody A. Friesen, Fort McDowell, AZ (US); Jose Antonio Bautista Martinez, Mesa, AZ (US)

(73) Assignee: ARIZONA BOARD OF REGENTS ACTING FOR AND ON BEHALF OF ARIZONA STATE UNIVERSITY, Tempe, AZ (US)

( * ) Notice: Subject to any disclaimer, the term of this patent is extended or adjusted under 35 U.S.C. 154(b) by 0 days.

(21) Appl. No.: 14/958,270

(22) Filed: Dec. 3, 2015

(65) Prior Publication Data

US 2016/0104883 A1  Apr. 14, 2016

Related U.S. Application Data

(62) Division of application No. 13/653,830, filed on Oct. 17, 2012, now Pat. No. 9,236,643.

(Continued)

(51) Int. Cl.
  *H01M 12/08*  (2006.01)
  *H01M 4/38*  (2006.01)
  (Continued)

(52) U.S. Cl.
  CPC .............. *H01M 4/38* (2013.01); *H01M 12/02* (2013.01); *H01M 12/06* (2013.01); *H01M 12/08* (2013.01);
  (Continued)

(58) Field of Classification Search
  None
  See application file for complete search history.

(56) References Cited

U.S. PATENT DOCUMENTS

| 4,774,011 A | 9/1988 | Mori et al. |
| 5,260,144 A | 11/1993 | O'Callaghan |

(Continued)

FOREIGN PATENT DOCUMENTS

| WO | WO 2010/132357 | 11/2010 |
| WO | 20110061728 A1 | 6/2011 |

(Continued)

OTHER PUBLICATIONS

Japanese Office Action dated Dec. 1, 2015 for Appln. No. 2014-547227.

(Continued)

*Primary Examiner* — Jonathan Crepeau
(74) *Attorney, Agent, or Firm* — Pillsbury Winthrop Shaw Pittman, LLP

(57) ABSTRACT

Provided in one embodiment is an electrochemical cell, comprising: (i) a plurality of electrodes, comprising a fuel electrode that comprises aluminum and an air electrode that absorbs gaseous oxygen, the electrodes being operable in a discharge mode wherein the aluminum is oxidized at the fuel electrode and oxygen is reduced at the air electrode, and (ii) an ionically conductive medium, comprising an organic solvent; wherein during non-use of the cell, the organic solvent promotes formation of a protective interface between the aluminum of the fuel electrode and the ionically conductive medium, and wherein at an onset of the discharge mode, at least some of the protective interface is removed from the aluminum to thereafter permit oxidation of the aluminum during the discharge mode.

39 Claims, 21 Drawing Sheets

Related U.S. Application Data

(60) Provisional application No. 61/577,490, filed on Dec. 19, 2011.

(51) Int. Cl.
 H01M 12/02 (2006.01)
 H01M 12/06 (2006.01)

(52) U.S. Cl.
 CPC ........... *H01M 2300/0002* (2013.01); *H01M 2300/0028* (2013.01); *Y02E 60/128* (2013.01); *Y10T 29/49108* (2015.01)

(56) References Cited

U.S. PATENT DOCUMENTS

| | | | |
|---|---|---|---|
| 5,316,875 A | 5/1994 | Murai et al. | |
| 5,631,100 A | 5/1997 | Yoshino et al. | |
| 6,288,889 B1 | 9/2001 | Komatsu et al. | |
| 6,306,509 B2 | 10/2001 | Takeuchi et al. | |
| 6,349,028 B1 | 2/2002 | Komatsu | |
| 6,652,729 B2 | 11/2003 | Melody et al. | |
| 6,852,446 B2 | 2/2005 | Barbarich | |
| 7,364,599 B2 | 4/2008 | Waynick | |
| 7,709,157 B2 | 5/2010 | Mie et al. | |
| 7,781,106 B2 | 8/2010 | Abe et al. | |
| 8,168,337 B2 | 5/2012 | Friesen et al. | |
| 8,180,512 B2 | 5/2012 | Kelty et al. | |
| 8,190,320 B2 | 5/2012 | Kelty et al. | |
| 8,309,259 B2 | 11/2012 | Friesen et al. | |
| 8,617,750 B2 | 12/2013 | Kruglick et al. | |
| 2002/0039688 A1 | 4/2002 | Barker et al. | |
| 2004/0197654 A1 | 10/2004 | Barker et al. | |
| 2009/0239113 A1 | 9/2009 | Hase et al. | |
| 2009/0284229 A1 | 11/2009 | Friesen et al. | |
| 2010/0119895 A1 | 5/2010 | Friesen | |
| 2010/0285375 A1 | 11/2010 | Friesen et al. | |
| 2010/0316935 A1 | 12/2010 | Friesen et al. | |
| 2011/0039181 A1 | 2/2011 | Friesen et al. | |
| 2011/0070506 A1 | 3/2011 | Friesen et al. | |
| 2011/0086278 A1 | 4/2011 | Friesen et al. | |
| 2011/0159368 A1 | 6/2011 | Hirose et al. | |
| 2011/0184903 A1 | 7/2011 | Sung | |
| 2011/0236799 A1 | 9/2011 | Burchardt et al. | |
| 2011/0257825 A1 | 10/2011 | Yamamoto et al. | |
| 2011/0281184 A1 | 11/2011 | Friesen et al. | |
| 2012/0082905 A1 | 4/2012 | Brown et al. | |
| 2012/0321968 A1* | 12/2012 | Sato .................. | H01M 12/06 429/403 |

FOREIGN PATENT DOCUMENTS

| | | | |
|---|---|---|---|
| WO | WO 2011087089 | * | 7/2011 |
| WO | WO 2011/143368 | | 11/2011 |

OTHER PUBLICATIONS

Australian Office Action dated Feb. 7, 2017 for Appln. No. 2012364773.
Chinese Office Action dated Feb. 3, 2016 for Appln. No. 201280069986.7.
International Search Report/Written Opinion dated Sep 26, 2013 of PCT/US2012/060581 filed Oct. 17, 2012 (11 pages).
International Search Report/Written Opinion dated Mar. 10, 2014 of PCT/US2012/060581 filed Oct. 17, 2012 (6 pages).
International Preliminary Report on Patentability dated May 27, 2014 of PCT/US2012/060581 filed Oct. 17, 2012 (7 pages).
Licht, S., et al., The effect of water on the anodic dissolution of aluminum in non-aqueous electrolytes, Electrochem. Comm. vol. 2, pp, 329-333 (2000).
Jiang, T., et al., "Electrodeposition of aluminium from ionic liquids: Part II—studies on the electrodeposition of aluminum from aluminum chloride ($AlCl_3$)-trimethylphenylammonium chloride (TMPAC) ionic liquids", Surface & Coatings Technology, vol. 201 pp. 10-18 (2006).
Stafford, G. R., et al., "In Situ Stress Measurements during Aluminum Deposition from $AlCl_3$-EtMeImCl Ionic Liquid", J. Electrochm. Soc., vol. 153, No. 4, pp. C207-C212 (2006).
Legrand, L., et al., "Electrodeposition Studies of Aluminum on Tungsten Electrode from $DMSO_2$ Electrolytes—Determination of ALIII Species Diffusion Coefficients", J. Electrochem. Soc., vol. 141, No. 2, pp. 378-382 (1994).
Legrand, L., et al., "Behaviour of Aluminum as Anode in Dimethylsulfone-Based electrolytes", Electrochimica Acta, vol. 39, Nos. 7-12, pp. 1427-1431 (1994).
Legrand, L., et al., Sulfone-Based Electrolytes for Aluminum Electrodeposition, Electrochima Acta, vol. 40, No. 11, pp. 1711-1716 (1995).
Shirai, K., et al., "Effects of trifluoroethanol as a co-solvent on the electrochemical oxidation of hardly oxidizable organic compounds", J. Electroanalytical Chem., vol. 507, pp. 191-197 (2001).
Bockris, et al., "A solar-hydrogen economy for U.S.A. International Journal of Hydrogen Energy", vol. 8, pp. 323-340 (1983).
Veziroglu, et al., "21st Century's energy: Hydrogen energy system, Energy Conversion and Management", vol. 49, pp. 1820-1831 (2008).
Licht, S., et al., "Solution Activators of Aluminum Electrochemistry in Organic Media", J. Electrochem. Soc., vol. 147, No. 2 pp. 496-501 (2000).
Mohammed, A. A., et al., "Electrochemical properties of aluminum anodes in gel electrolyte-based aluminum-air batteries", Corrosion Sci., vol. 50, No. 12, pp. 3475-3479 (2008).
Moustafa, E.M., et al., "Butyl-1-methylpyrrolidinium Bis(trifluoromethylsulfonyl)amide and 1-Ethyl-3-methylimidazolium", Chem. B, vol. 111, No. 18, pp. 4693-4704 (2007).
Moustafa, E.M., et al., "Electrodeposition of Nano- and Microcrystalline Aluminium in Three Different Air and Water Stable Ionic Liquids", ChemPhysChem., vol. 7, No. 7, pp. 1535-1543 (2006).
Li, Q., et al., "Aluminum as anode for energy storage and conversion: a review", J. Power Sources, vol. 11, No. 1, pp. 1-10 (2002).
"Hydrogen Redox in Protic Ionic Liquids and a Direct Measurement of Proton Thermodynamics", 1 A. Bautista-Martinez, et al. J. Phys. Chem. C, 2009, vol. 113, No. 28, 12586-12593.

* cited by examiner

ALUMINUM-BASED METAL-AIR BATTERIES

CROSS-REFERENCE TO RELATED APPLICATIONS

This application is a divisional of U.S. application Ser. No. 13/653,830, filed Oct. 17, 2012, which claims the benefit of priority to U.S. Provisional Application Ser. No. 61/577,490 filed Dec. 19, 2011, the entire contents of both applications are incorporated herein by reference in their entirety.

GOVERNMENT FUNDING STATEMENT

All publications, patents, and patent applications cited in this Specification are hereby incorporated by reference in their entirety. This invention was made with U.S. government support under Contract No. DE-AR-00000038 awarded by the Department of Energy. The government has certain rights in the invention.

BACKGROUND

Metal-air cells are well-known, and include a metal fuel electrode and an air electrode. During discharge, the metal fuel is oxidized at the metal fuel electrode and oxygen is reduced at the air electrode. In metal-air cells of the rechargeable (a.k.a. "secondary") type, the metal fuel may be reduced on the fuel electrode, and oxygen may be evolved by oxidation at the air electrode or a separate charging electrode.

One of the most promising materials for high-performance batteries is aluminum due to its high volumetric capacity (8043 $AhL^{-1}$) compared to other typical battery materials, such as zinc (5849 $AhL^{-1}$) and lithium (2061 $AhL^{-1}$). Additionally, aluminum is both an abundant and relatively inexpensive material. Usually, it is possible to obtain adequate reduction-oxidation ("redox") behavior of aluminum in a non-aqueous solution using $AlCl_3$ as a source of aluminum ions in chloride ionic liquids and molecular solvents. However, the chloride ions can have significant drawbacks. For example, the main species responsible for the electrochemical behavior of aluminum ($Al_2Cl_7^-$) is not air stable and easily decomposes in the presence of small quantities of water. The challenges of using aluminum as a battery material are compounded by the extremely rapid formation of an oxide layer on aluminum metal. In a battery, this oxide layer can passivate aluminum electrodes, even in electrolytes with low water concentration. If a constant positive current is applied to an aluminum electrode, the overpotential needed to maintain the current increases with time, thereby drawing an increasing amount of parasitic power.

In order to overcome the inherent challenges presented by the selection of aluminum as an electrode material in a high-performance battery, an electrolytic medium that is able to substantially inhibit the surface passivation of an aluminum electrode and simultaneously allow the redox reactions to take place within the battery is necessary. Specifically, what is needed is:
  a. An aluminum chemistry and electrolytic media that is air- and water-stable.
  b. An electrolytic media that, under open-circuit conditions, forms a nearly perfect passivating film at the aluminum interface (i.e., does not permit self-discharge to take place at the aluminum electrode).
  c. An electrolytic media that, under polarization or discharge conditions, "lites off" (i.e. is removed under electrochemical action) the passivating film at low overpotential and allows sustained faradaic aluminum oxidation to occur (i.e., that enables a power dense, high capacity battery configuration).
  d. An electrolytic media that solvates or complexes aluminum ions such that faradaic oxidation results in etching of the aluminum interface as opposed to formation of an anodic oxide film (i.e., that enables flat discharge and high capacity).
  e. An electrolytic media that, upon going from an anodic polarization condition to an open-circuit condition, rapidly re-forms the passivating film to prevent self-discharge (i.e., allows for many partial discharge events, and long shelf-life after the first discharge event).
  f. An electrolytic media that has a high boiling point and a low melting point so as to efficiently operate in a wide climate spectrum.
  g. A system that minimizes parasitic reactions, enabling the highest possible current efficiency.

Several methods of protecting reactive-metal electrodes (e.g. aluminum) from surface passivation have been proposed. Explicitly protective measures that employ ion-selective membranes, fast ion-conducting ceramic membranes, two-phase electrolytic systems, and thick-variant air cathodes are several non-limiting examples. However, all of these methods result in complex cell architectures that remove the majority of the energy density offered by aluminum.

Rather than pursuing explicit protection of the chemistry of an aluminum-air cell, which substantially reduces available energy density, a solution is provided wherein the aluminum-electrolyte interface is implicitly protected and optionally activated. An electrolytic media that protects the electrode surface by preventing passivation is made possible through the use of solution activators, or dissolved metal salts.

SUMMARY

One object of the presently described embodiments is to provide an electrochemical cell with an electrolytic medium that is able to substantially inhibit passivation of aluminum electrodes during non-use of the cell but permit redox reactions to take place at the electrodes during discharge mode.

One embodiment provides an electrochemical cell, the cell comprising: (i) a plurality of electrodes, comprising a fuel electrode that comprises aluminum and an air electrode that absorbs gaseous oxygen, the electrodes being operable in a discharge mode wherein the aluminum is oxidized at the fuel electrode and oxygen is reduced at the air electrode, and (ii) an ionically conductive medium comprising an organic solvent; wherein during non-use of the cell, the organic solvent promotes formation of a protective interface between the aluminum of the fuel electrode and the ionically conductive medium, and wherein at the onset of discharge mode, at least some of the protective interface is removed from the aluminum to thereafter permit oxidation of the aluminum during discharging.

Another embodiment provides a method of operating an electrochemical cell, the method comprising: (i) providing an electrochemical cell, comprising: (a) a plurality of electrodes comprising a fuel electrode that comprises aluminum and an air electrode that absorbs gaseous oxygen, the electrodes being operable in a discharge mode, and (b) an ionically conductive medium, comprising an organic solvent, and (ii): allowing the ionically conductive medium to contact at least a portion of the fuel electrode and the air electrode such that the electrodes are in a discharge mode, whereby gaseous oxygen is reduced at the air electrode and a metal fuel is oxidized at the fuel electrode; wherein during non-use of the cell, the organic solvent promotes formation of a protective interface between the aluminum of the fuel electrode and the ionically conductive medium; and wherein at the onset of discharge mode, at least some of the protective interface is removed from the aluminum to thereafter permit oxidation of the aluminum during discharging.

Another embodiment provides a method of making a metal-air electrochemical cell, comprising: (i) providing a metal-air electrochemical cell, comprising: (a) a fuel electrode that comprises aluminum and an air electrode that absorbs gaseous oxygen, the fuel electrode and the air electrode being operable in a discharge mode, and (b) an ionically conductive medium, and (ii) adding an organic solute to the ionically conductive medium, such that during non-use of the cell, the organic solute promotes formation of a protective interface between the aluminum of the fuel electrode and the ionically conductive medium, and at the onset of discharge mode, at least some of the protective interface is removed from the aluminum to thereafter permit oxidation of the aluminum during discharging.

Other objects, features, and advantages of the present invention(s) will become apparent from the following detailed description, the accompanying drawings, and the appended claims.

BRIEF DESCRIPTION OF THE DRAWINGS

FIG. 15a shows a cyclic voltammogram of an aluminum electrode in a butyrolactone-Al(TF)$_3$ 1 M solution. FIG. 15b shows a chronopotentiogram of an aluminum electrode in the same solution. FIGS. 15c and 15d show cyclic voltammograms and chronopotentiograms, respectively, of an aluminum electrode in a pentanolactone-Al(TF)$_3$ 1 M solution, and FIGS. 15e-15g show chronopotentiograms for hexano-, octano-, and decanolactone-Al(TF)$_3$ 1 M solutions respectively.

DETAILED DESCRIPTION

Figure 1A:
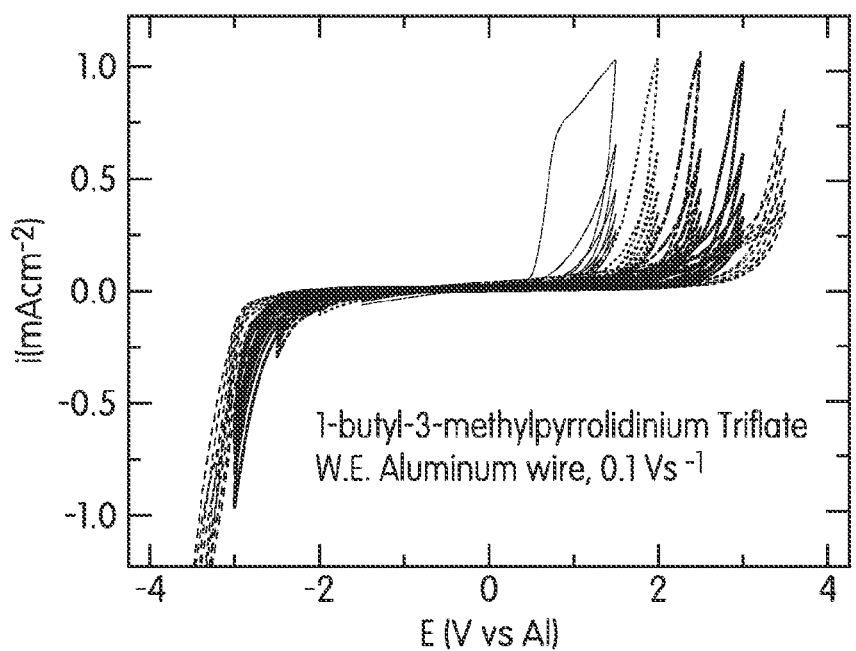
FIGS. 1$a$-1$b$ shows a) a cyclic voltammogram (CV) and b) a chronopotentiogram (CP) of an aluminum electrode in a neat butyl methylpyrrolidinium triflate ionic liquid in one embodiment. The electrolyte was dried overnight at 110° C. and cooled under an argon atmosphere. The voltammogram was obtained at a scan rate of 0.1 Vs$^{-1}$ at room temperature. The chronopotentiogram was obtained at a constant current of 200 µAcm$^{-2}$ for 1200 seconds at room temperature.
Figure 1B:
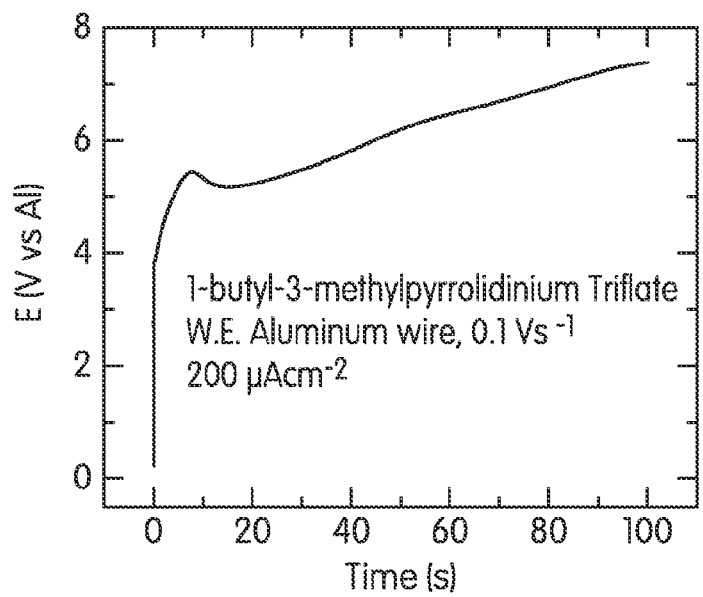

One embodiment provides an electrochemical cell, the cell comprising: (i) a plurality of electrodes comprising a fuel electrode that comprises aluminum and an air electrode that absorbs gaseous oxygen, the electrodes being operable in a discharge mode wherein the aluminum is oxidized at the fuel electrode and oxygen is reduced at the air electrode, and (ii) an ionically conductive medium comprising an organic solvent; wherein during non-use of the cell, the organic solvent promotes formation of a protective interface between the aluminum of the fuel electrode and the ionically conductive medium, and wherein at the onset of discharge mode, at least some of the protective interface is removed from the aluminum to thereafter permit oxidation of the aluminum during discharging.

Electrodes

The electrochemical cell described herein can be any type of cell. For example, it can be a primary cell, a secondary cell, or a combination thereof. A "primary" cell can refer to a battery in which the electrochemical (redox) reaction is not reversible. On the other hand, a "secondary" cell can refer to a battery in which the electrochemical reaction is reversible. The electrochemical cell can also be exposed to air, such as ambient air. The presently described cell can operate at a variety of temperatures. For example, in one embodiment, the cell is operated at room temperature (20° C.).

The fuel electrode may have any construction or configuration. For example, it is possible for the fuel electrode to be a porous structure with a three-dimensional network of pores, a mesh screen, a plurality of mesh screens isolated from one another, or any other suitable electrode. The fuel electrode can include a current collector, which may be a separate element, or the body on which the fuel is received may be electroconductive and thus also be the current collector. In one embodiment, the fuel electrode is laminated, bonded, or attached to a backing that provides the external surface of the fuel electrode. This backing is liquid impermeable or essentially impermeable to the electrolytic medium to prevent it from permeating outwardly through the fuel electrode via its external surface. The backing can also be impermeable to air, particularly oxygen or other oxidant, to prevent any undesirable parasitic reaction, such as oxidant reduction in the presence of the fuel oxidation that occurs at the electrode during discharge.

In one embodiment, the fuel electrode comprises aluminum. In another embodiment, the fuel electrode consists essentially of aluminum. For example, the fuel electrode may contain certain impurities that are incidental impurities or impurities intentionally added.

The air electrode may be made porous to provide gaseous oxygen diffusion from the air side of the electrode to reaction sites within the electrode and to provide ionic conductivity for reactants and reaction products on the electrolyte side of the electrode. The air electrode may have a level of solvophobicity with the ionically conductive medium to prevent or essentially prevent wicking (i.e., liquid permeation) of the electrolyte through the structure. A current collector may be embedded in the electrode to provide high electrical conductivity. The materials of construction may include carbon particles; PTFE, FEP, PFA, or another fluorinated polymer; electrocatalysts that may be metal oxides such as manganese oxide, nickel oxide, cobalt oxide, or doped metal oxides; electrocatalysts that may be metals such as nickel, cobalt, manganese, silver, platinum, gold, palladium or another electrocatalytically active material. Further details regarding the air electrode may be found in U.S. patent application Ser. Nos. 12/385,217, 12/385,489, 12/631,484, 12/549,617, 12/776,962, 12/885,268, 12/901,410, 61/329,278, 61/243,970, 61/414,579, 61/301,377, 61/323,384, 61/304,928, 61/334,047, 61/365,645, 61/378,026, 61/394,954, 61/358,339, 61/383,510 and 61/355,081 the entirety of which are incorporated herein.

The specific construction of the battery cell itself is not limiting, and metal-air battery constructions are known in the art.

Ionically Conductive Medium

The electrochemical cell described herein can comprise an ionically conductive medium, which can be interchangeably referred to as "electrolyte" or "electrolyte solution" in some instances. The ionically conductive medium can contact at least a portion of the fuel electrode and the air electrode such that the electrodes are in a discharge mode, whereby gaseous oxygen is reduced at the air electrode and a metal fuel is oxidized at the fuel electrode.

The medium can comprise ions, such as anions, cations, or both, that can be mobile so as to transport electrons. The ions in the medium can be supplied by a metal salt dissolved in the medium. Any ions can be used, depending on the application. For example, in one embodiment, the ionically conductive medium can comprise a dissolved salt that comprises at least one metal triflate. The metal in the triflate can be sodium, copper, aluminum, or combinations thereof. The anions can be any anions, such as hydroxide ions. In one embodiment, the ionically conductive medium can be substantially free of chloride ions. For example, the medium may avoid having a dissolved metal salt that is aluminum chloride. Further, the ionically conductive medium can comprise an additive, such as a hygroscopic additive. The additive can comprise a metal salt. The additive can be, for example, $Al(OH)_3$, $Al(triflate)_3$, $Al(acetate)_3$, and $Al(TFSI)_3$.

The ionically conductive medium can be an aqueous solution or it can be substantially free of water. For example, the medium can comprise at least one ionic liquid, and particularly a low-temperature ionic liquid (that is, an ionic liquid having a melting point below 150° C.) or a room-temperature ionic liquid (that is, an ionic liquid having a melting point below 100° C.). In one embodiment, the medium can consist of a low- or room-temperature ionic liquid. Alternatively, the ionically conductive medium can comprise a solvent, such as an organic solvent.

The water content in the ionically conductive medium can vary. For example, in one embodiment, the medium is substantially free of water. In another embodiment, the ionically conductive medium comprises at least some water. For example, the water content can be between about 2.5 wt % and about 20 wt %, such as about 3.5 wt % and about 15 wt %, such as 5 wt % to about 10 wt %. In one embodiment, the fuel electrode comprises aluminum and the ionically conductive medium comprises at least some water.

The ionically conductive medium can comprise an organic solvent in one embodiment. Depending on the application, any type of organic solvent can be used. For example, the solvent can comprise a molecule having a cyclic structure, such as an ester. In one embodiment, the organic solvent comprises a lactone. All types of lactone can be used as the organic solvent. For example, the lactone can be a butyrolactone (i.e., γ-butyrolactone), a pentanolactone (i.e., γ-pentanolactone), a hexanolactone (i.e., γ-hexanolactone), an octanolactone (i.e., γ-octanolactone), a decanolactone (i.e., γ-decanolactone), or combinations thereof. A molecule that has a similar structure may also be used. For example, the organic solvent can comprise a pyrrolidinone.

In one embodiment, the ionically conductive medium comprises a metal triflate, such as an aluminum triflate, dissolved in the organic solvent that comprises a lactone. The metal triflate can be in the organic solvent at a concentration that, for example, is less than or equal to about 3 M, less than or equal to about 2 M, less than or equal to about 1 M or less than or equal to about 0.5 M.

In some embodiments, the ionically conducting medium can be an ionic liquid. For example, the ionic liquid can be a lactone-based ionic liquid. An organic solvent-based ionic liquid herein can refer to an ionic liquid that is solvated in or by the organic solvent. The lactone can be based on any of the lactone motifs described above. For example, the ionic liquid can be one based on a butyrolactone, pentanolactone, hexanolactone, octanolactone, decanolactone, or combinations thereof. Also, the room- or low-temperature ionic liquid may comprise ions derivatized from a lactone motif and those ions may be the ionic liquid cation, anion, or both. Thus, an ionic liquid derivatized from an organic solvent, such as lactone, would still be regarded as including an organic solvent because of the presence of the organic solvent ion in its pair or complex.

The ionically conductive medium can have two functions—conducting ions and preventing the open-circuit corrosion of the fuel electrodes. In some embodiments, the medium can achieve the latter by promoting the formation of a protective interface on the fuel electrode to avoid passivation of the electrode. The formation can be by chemisorption, physisorption, complexation, hydrogen bonding, ionic reaction, or combinations thereof. For example, the ionically conductive medium can include at least one chemical species or constituent that can affect the formation of the protective interface with respect to a rate of the formation, affect the form (e.g. a structural characteristic) of the protective interface formed, or both. Such a species or constituent can sometimes be referred to as a "protective additive" or a "protective component."

The organic solvent in some embodiments can serve as a protective additive/component. In some embodiments, the organic solvent can promote the formation of a protective interface between the aluminum of the fuel electrode and the ionically conductive medium when the electrochemical cell is in the non-use mode. That is, when the desired redox reactions of the cell are not taking place and thus no electricity is generated, the organic solvent can promote the formation of a protective layer that can prevent the surface of the fuel electrode from oxidizing. On the other hand, when the cell enters a discharge mode, at the onset of the discharge mode, at least some of the protective interface is removed from the aluminum to thereafter permit oxidation of the aluminum during discharging (e.g. the "lite-off" event).

In one embodiment, prevention of the oxidation (or passivation) of the fuel electrode during non-use of the cell by the protective interface can occur by having the protective interface inhibit the oxidation of the metal in the fuel electrode by the ions, such as the anions, present in the ionically conductive medium. Such a protective interface can be particularly useful for a metal that oxidizes easily—e.g., aluminum. Not to be bound by any particular theory, but the inhibiting capability of the protective interface may arise from the protective additive/component decreasing the electrochemical overpotential needed to initiate and continuously support oxidation of aluminum in the presence of water, gaseous oxygen, or both, during discharge mode. As a result, in one embodiment the electrochemical potential difference between the fuel electrode and the air electrode remains largely similar throughout discharge, only changing due to standard state-of-charge related overpotential changes (e.g. transport- and conductivity-related losses), but substantially unchanged due to changing overpotential at the anode-electrolyte interface.

As a result, when the cell is not being used, the protective interface can prevent the fuel electrode from passivating or cause any passivation to be easily removable; and when the cell is in use, the protective interface can be removed to allow continuous redox reactions to take place at the electrodes in the cell. The step of removal can take place in several ways. For example, the interface can break down; the protective molecule can dissolve, etc. The amount of protective layer being removed at the onset of discharge mode can vary. For example, it can be partially removed, substantially removed, or entirely removed. In one embodiment, at least 50 area % of the interface layer, such as at least about 60 area %, such as at least about 70 area %, such as at least about 80 area %, such as at least about 90 area %, such as at least about 95 area %, such as at least about 99 area %, such as at least about 99.5 area %, such as at least about 99.0 area % of the passivating interface is removed. Depending on the application and technique employed, the aforementioned percentages can be volume or weight percentages instead of area percentages. In some instances, a disruption of the interface may constitute removal. Thus, the term remove is not limited to its mechanical sense (although that may be the case in some instances), and may cover any disruption, alteration or change to or at the interface that removes its protective functionality and permits oxidation of the fuel during discharge.

The protective interface need not be a layer with a certain definite thickness. For example, the interface can be very thin (e.g., a monolayer of, for example, a protective molecule) such that it is not generally described by its thickness. Alternatively, the interface can be a layer with a certain thickness. The thickness can be in the nanometer range, in the micron range, or even in the millimeter range. The thickness of the layer can be uniform or not uniform along the length of the layer.

Also, provided herein are methods of forming a protective interface in an electrochemical cell to inhibit passivation of the fuel electrode surface, which interface is able to be removed at the onset of a discharge mode. In one embodiment, a method of operating an electrochemical cell is provided. The method comprises: (i) providing an electrochemical cell comprising: (a) a plurality of electrodes comprising a fuel electrode that comprises aluminum and an air electrode that absorbs gaseous oxygen, the electrodes being operable in a discharge mode, and (b) an ionically conductive medium comprising an organic solvent, and (ii) allowing the ionically conductive medium to contact at least a portion of the fuel electrode and the air electrode such that the electrodes are in a discharge mode, whereby gaseous oxygen is reduced at the air electrode and a metal fuel is oxidized at the fuel electrode; wherein during non-use of the cell, the organic solvent promotes formation of a protective interface between the aluminum of the fuel electrode and the ionically conductive medium; and wherein at the onset of discharge mode, at least some of the protective interface is removed from the aluminum to thereafter permit oxidation of the aluminum during discharging.

Alternatively, a method described herein can be used to make a metal-air electrochemical cell with the aforedescribed protective interface. The method comprises (i) providing a metal-air electrochemical cell comprising: (a) a fuel electrode that comprises aluminum and an air electrode that absorbs gaseous oxygen, the fuel electrode and the air electrode being operable in a discharge mode, and (b) an ionically conductive medium, and (ii) adding an organic solvent to the ionically conductive medium, such that during non-use of the cell, the organic solvent promotes formation of a protective interface between the aluminum of the fuel electrode and the ionically conductive medium, and at the onset of discharge mode, at least some of the protective interface is removed from the aluminum to thereafter permit oxidation of the aluminum during discharging.

Additional processing steps can be included in the methods described herein. For example, the surface of the fuel electrode can be polished before the reaction takes place. The methods can also include a method of making the ionically conductive medium that can provide a protective interface. For example, in one embodiment, the medium can be made by reacting an α-hydroxy-γ-butyrolactone and choline hydroxide.

The electrodes and ionically conductive medium can be any of those described above. In one particular embodiment, the fuel electrode comprises aluminum, and the ionically conductive medium comprises an organic solvent that comprises a lactone. As aforedescribed, the ionically conductive medium can comprise a metal salt, such as a metal triflate, or an ionic liquid dissolved in the organic solvent. The ionically conductive medium can be substantially free of chloride ions; for example, the medium can be substantially free of aluminum chlorides.

In some embodiments, the electrochemical cell described herein can be exposed to ambient air, such that the cell can be exposed to a certain amount of water and ambient air. The methods described herein can take place at a low temperature, such as lower than about 200° C., such as lower than about 150° C., such as lower than about 100° C., such as lower than about 60° C., such as lower than about 40° C. In other words, in some embodiments, the protective interface can be formed at room temperature.

The protective interface at the metal fuel/ionically conductive medium is characterized such that during use it protects the metal fuel, and particularly aluminum, against passivation during non-use of the cell, i.e., when it is not being used to deliver current to an extended load. However, the protective interface is also characterized such that it is removed at a potential difference within the discharge capability of the cell. That is, if the cell is capable of generating a potential difference of X volts during discharge, the protective interface can be removed at a lower potential to permit the continued oxidation of the metal fuel during discharge. While not being bound by any particular theory, it is believed that this occurs because the protective interface allows contact between the metal fuel and the ionically conductive medium to support the generation of a potential difference at the onset of discharge, but not so much as to allow passivation driven by water pressure to freely occur.

In contrast, in prior attempts to create a metal-air cell using aluminum as the metal fuel, the presence of water in the electrolyte solution, or in general the electrolytic solution—aqueous or non-aqueous, causes passivation of aluminum is either too passivating to result in a working electrochemical cell, or is de-passivating to an extent that results in a large degree of self-corrosion or air-reactivity.

Non-Limiting Working Examples

Comparison to Existing System

At the outset, as a contrast, pre-existing metal-air batteries frequently encounter the difficulty of non-reversible passivation (or passivation that requires such a high level of energy to remove that for all practical purposes it is not reversible). FIGS. 1(a) and (b) show that the continuous increase in the electrochemical window of an aluminum electrode in butyl methylpyrrolidinium triflate results in complete aluminum passivation. This passivation is not reversible and the electrode is recovered and reinstated to its original behavior by physically removing (e.g., scratching) the passivated layer (i.e., oxide layer) from the electrode surface.

Figure 2A:
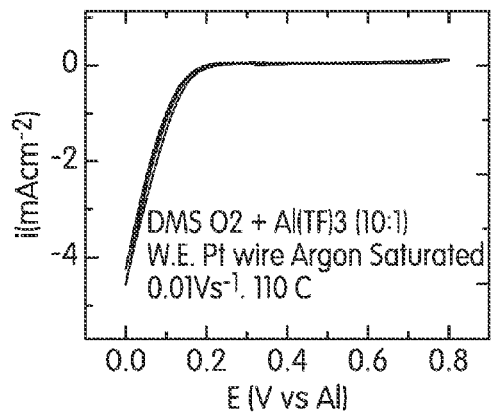
FIGS. 2$a$-2$d$ shows cyclic voltammograms of a platinum electrode in various metal triflate electrolytes in one embodiment: a) dimethylsulfone (DMSO$_2$)-aluminum triflate (Al(TF)$_3$) at a molar ratio of 10:1, b) DMSO$_2$-copper triflate (Cu(TF)$_2$) at a molar ratio of 10:1, c) DMSO$_2$-Al(TF)$_3$ at a molar ratio of 10:1 and Cu(TF)$_2$ at 10 mM, and d) DMSO$_2$-Al(TF)$_3$ at a molar ratio of 10:1 and 10 mM of Cu(I) added by oxidation of Cu wire. Electrolytes were dried overnight at 150° C. and cooled under an argon atmosphere. The voltammograms were obtained at a scan rate of 0.1 Vs$^{-1}$ at 110° C.

Several systems that have attempted to use organic solvents with dissolved metal salts to overcome irreversible passivation of aluminum have been previously studied, but none were able to overcome the inherent challenges of this problem. For example, works of electrochemical deposition and dissolution of aluminum in dimethylsulfone ($DMSO_2$) and $AlCl_3$ have been reported. At the outset, none of these prior electrolyte systems with $AlCl_3$ can be used at room temperature because the melting point of $DMSO_2$ is 110° C. Also, the prior systems do not allow plating or stripping of aluminum in $DMSO_2$ if non-chloride salts are used, as shown in the CV obtained in $DMSO_2$-aluminum triflate solutions (FIG. 2(a)). The figure shows only a single cathodic signal without evidence of aluminum deposition on a platinum electrode.

Figure 2B:
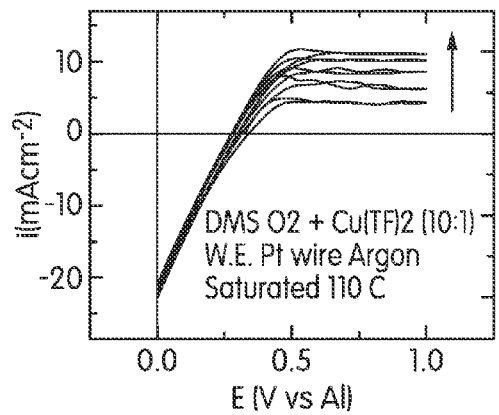
Figure 2C:
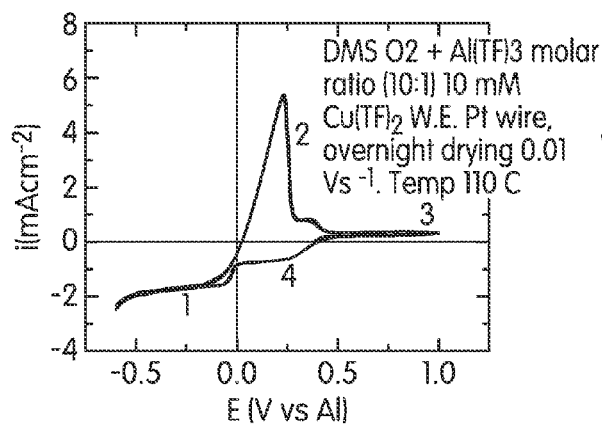
Figure 2D:
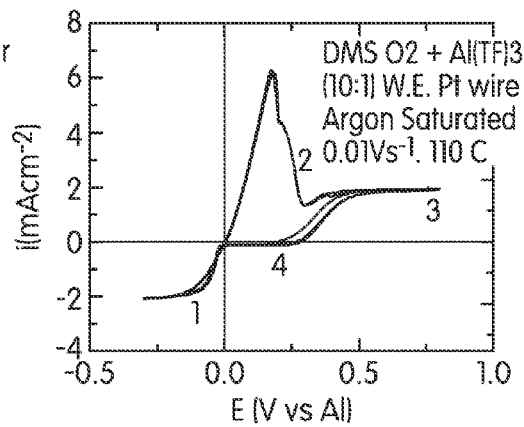

A reversible aluminum CV is attained only when co-deposition of a second metal is used, as shown in FIGS. 2(c)

and 2(d), in which is shown the co-deposition of Cu(II) ions added as copper triflate and electrochemical oxidation of a copper wire, respectively. Specifically, under these conditions, a cathodic wave (1) corresponding to the aluminum-copper deposition (FIGS. 2(c) and 2(d)) is observed, followed by the anodic stripping wave (2) and the signals for the Cu(I) to Cu(II) oxidation (3) and Cu(II) to Cu(0) reduction (4). Note that the use of Cu(II) in the absence of aluminum triflate (FIG. 2(b)) does not produce the reversible behavior as shown in FIGS. 2(c) and (d). While co-deposition with copper allows an aluminum system to operate at room temperature, the presence of copper ions alters the aluminum reference potential used in the experiments and shifts the potential undesirably to a less negative potential.

Present System

Figure 3A:
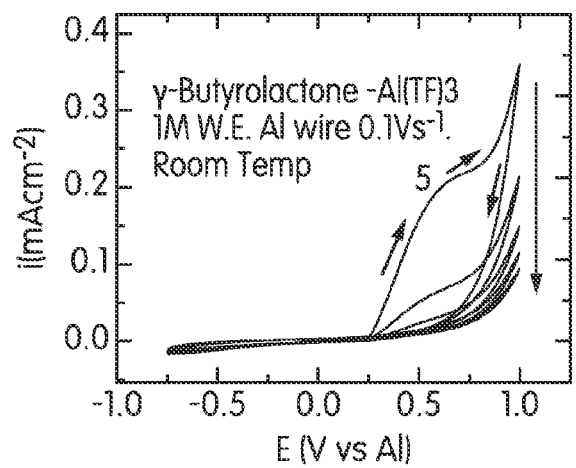
FIGS. 3$a$-3$c$ shows cyclic voltammograms of an aluminum electrode with various metal triflates in lactone in one embodiment: a) γ-butyrolactone-Al(TF)$_3$ 1 M, b) γ-butyrolactone-sodium triflate (NaTF) 1 M, and c) γ-butyrolactone-aluminum chloride (AlCl$_3$). The solvent and salts were used as received. The voltammograms were obtained at a scan rate of 0.1 Vs$^{-1}$ at room temperature.
Figure 3B:
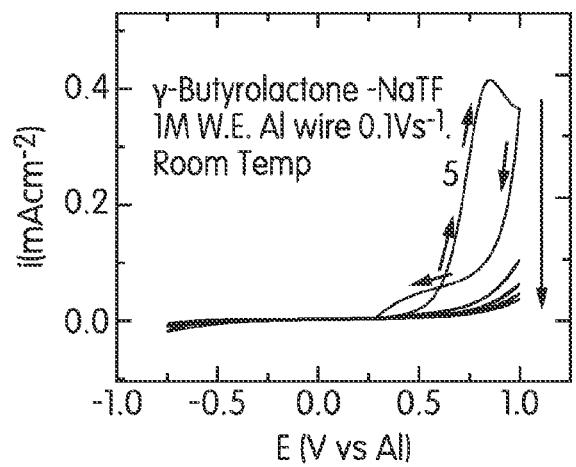
Figure 3C:
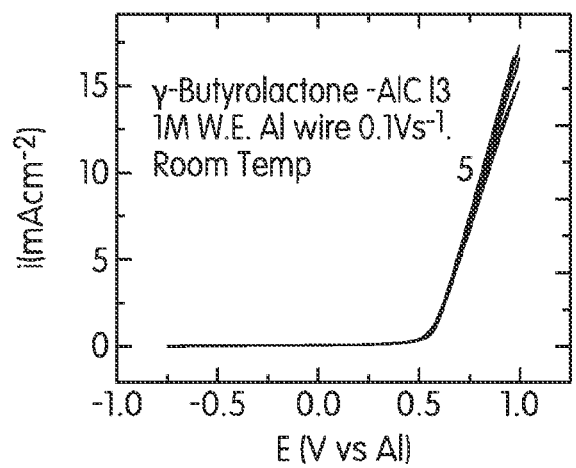

The CV corresponding to γ-butyrolactone and aluminum triflate (FIG. 3(a)) shows an oxidation wave that rapidly disappears in consecutive cycles. Similar behavior is exhibited by the sodium triflate solution (FIG. 3(b)). Passivation of the aluminum electrode is likely due to the presence of water in the electrolyte. In the case of butyrolactone and aluminum chloride (FIG. 3(c)), the oxidation wave does not show passivation during the CV experiments.

Figure 4A:
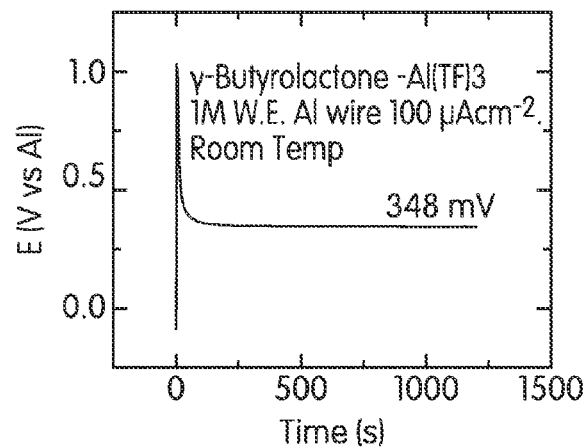
FIGS. 4$a$-4$c$ shows chronopotentiograms of an aluminum electrode with various metal triflates in lactone in one embodiment: a) γ-butyrolactone-Al(TF)$_3$ 1 M, b) γ-butyrolactone-NaTF 1 M, and c) γ-butyrolactone-AlCl$_3$ 1 M. The solvent and salts were used as received. The chronopotentiograms were obtained at a constant current of 100 µAcm$^{-2}$ for 1200 seconds at room temperature.
Figure 4B:
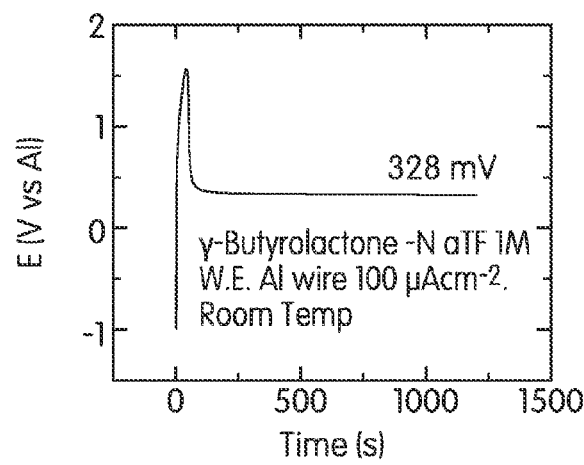
Figure 4C:
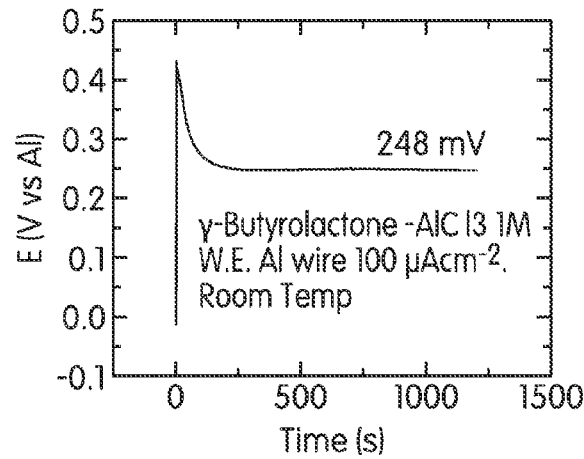
Figure 19A:
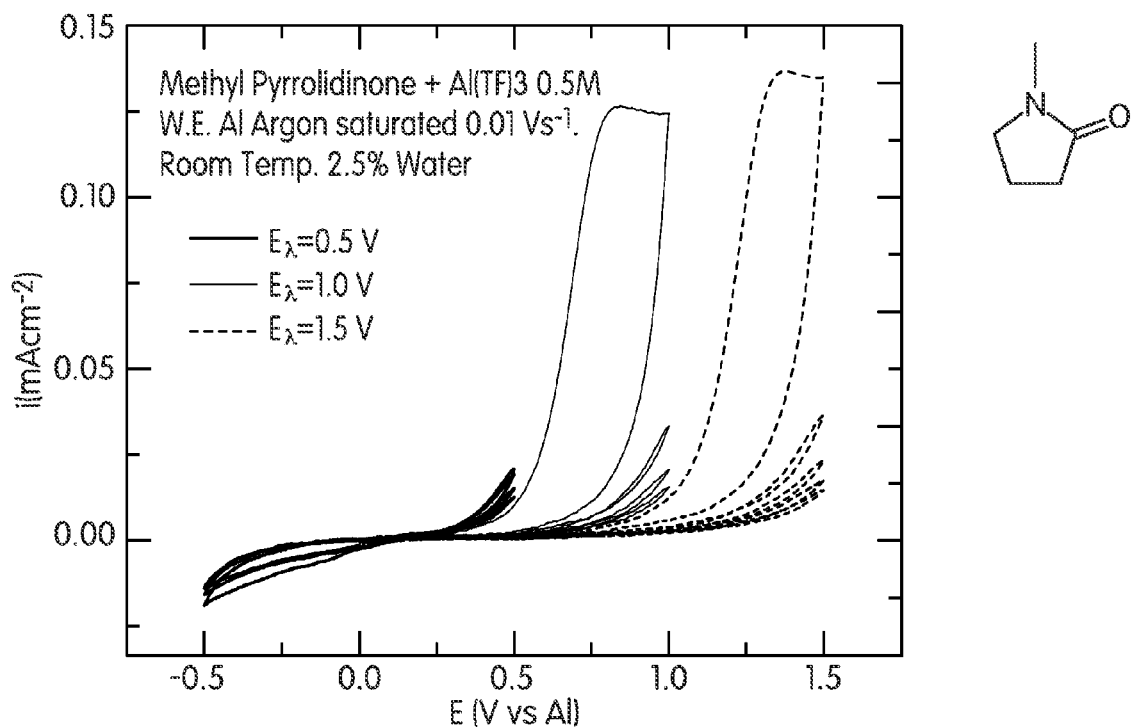
FIGS. 19a-19b shows a) a cyclic voltammogram and b) a chronopotentiogram of an aluminum electrode in methyl pyrrolidinone and aluminum triflate at 0.5 M in one embodiment. The voltammogram was obtained at a scan rate of 0.01 Vs$^{-1}$ at room temperature. The chronopotentiogram was obtained at a constant current of 100 µAcm$^{-2}$ for 1200 seconds at room temperature.
Figure 19B:
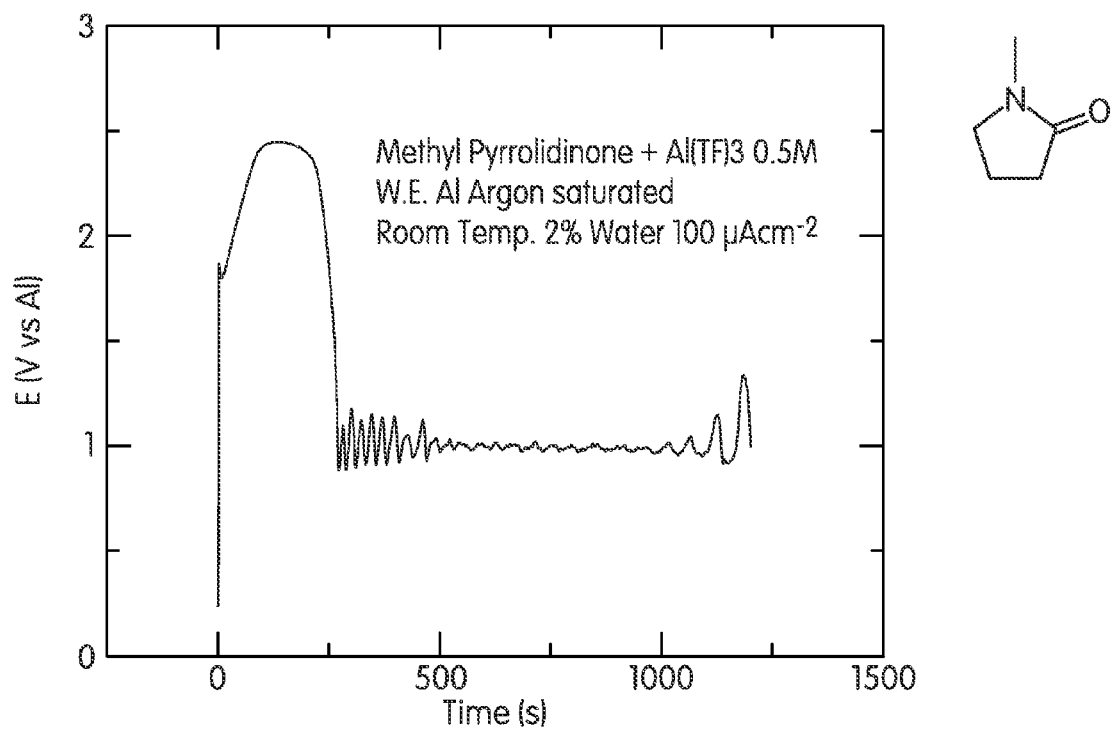

By contrast, as shown in FIGS. 4(a) through 4(c), when a constant current is applied to the aluminum electrodes, the corresponding potential-time signal increases initially, reaches a potential maximum, and subsequently decreases until a constant potential is established. In particular, the lower constant potential was obtained in the butyrolactone-aluminum chloride (FIG. 4(c)), but the potentials for aluminum triflate (FIG. 4(a)) and sodium triflate (FIG. 4(b)) were only 100 mV and 80 mV more positive than that corresponding to the chloride electrolyte. That is, butyrolactone permitted continuous oxidation of aluminum, even in non-chloride electrolytes. The butyrolactone was dried by heating at 110° C. (overnight and argon-purged) and the final water content was 0.7 ppm. After the addition of 1 M aluminum triflate, the water content increased to 3.6%. The electrolyte was again heated to 110° C. and purged with argon for 24 hours. The resulting water content decreased to only 3.5%, indicating that the hygroscopicity of aluminum triflate tends to ensure that at least some concentration of water is retained. FIGS. 19(a) and (b) provide results of butyrolactone-Al(TF)$_3$ systems in one embodiment.

Figure 5A:
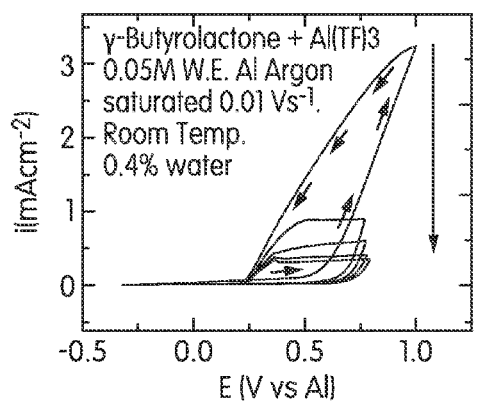
FIGS. 5$a$-5$d$ shows cyclic voltammograms of an aluminum electrode in a γ-butyrolactone-Al(TF)$_3$ solution at various concentrations and water content in one embodiment: a) Al(TF)$_3$ 0.05 M and 0.4% water, b) Al(TF)$_3$ 0.3 M and 1.5% water, c) Al(TF)$_3$ 1.7 M and 2.1% water, and d) Al(TF)$_3$ 1 M and 3.5% water. The voltammograms were obtained at a scan rate of 0.1 Vs$^{-1}$ at room temperature.
Figure 5B:
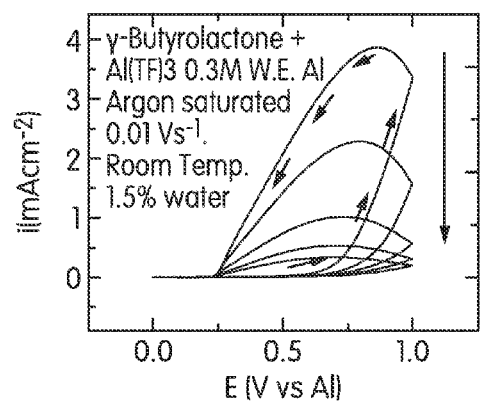
Figure 5C:
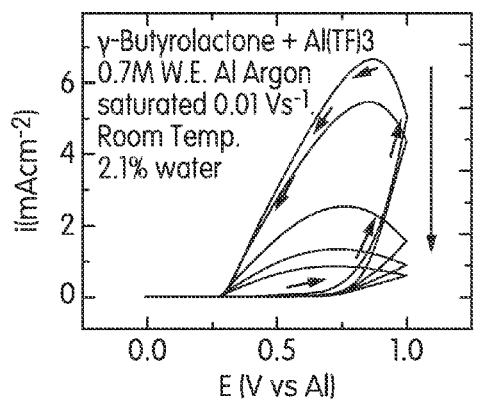
Figure 5D:
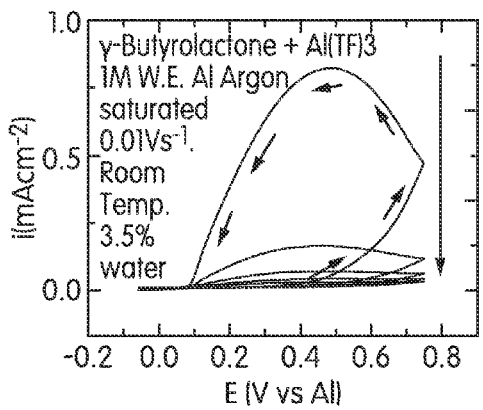

In order to modify the water content in the butyrolactone-aluminum triflate (Al(TF)$_3$) electrolytes, different concentrations of Al(TF)$_3$ were used in the electrochemical oxidation of aluminum electrodes. The voltammperometric behavior corresponding to the depassivation of the electrode surface is shown in FIGS. 5(a) through 5(d). In these CVs, the scan in the positive direction has a current density lower than that in the opposite direction (as indicated by the small arrows in the CVs). This anodic wave decreases with consecutive cycles for all concentrations of Al(TF)$_3$, but at higher concentrations (e.g., 1 M, as shown in FIG. 5(d)) the first scan in the voltammetry reaches a lower current density and consecutive drops are more rapid than at other concentrations (0.05 M, 0.3 M, and 0.7 M, for example, as shown respectively in FIGS. 5(a), 5(b), and 5(c)).

Moreover, the potential difference shown as the initial maximum is the difference required to remove the protective interface formed on the aluminum electrode, and is within the potential difference that the cell is capable of generating during discharge, which in theory is on the order of 1 to 2.8 V between aluminum oxidation and O$_2$ reduction, and in practice is typically on the order of 0.8 to 2.2 V.

Figure 6:
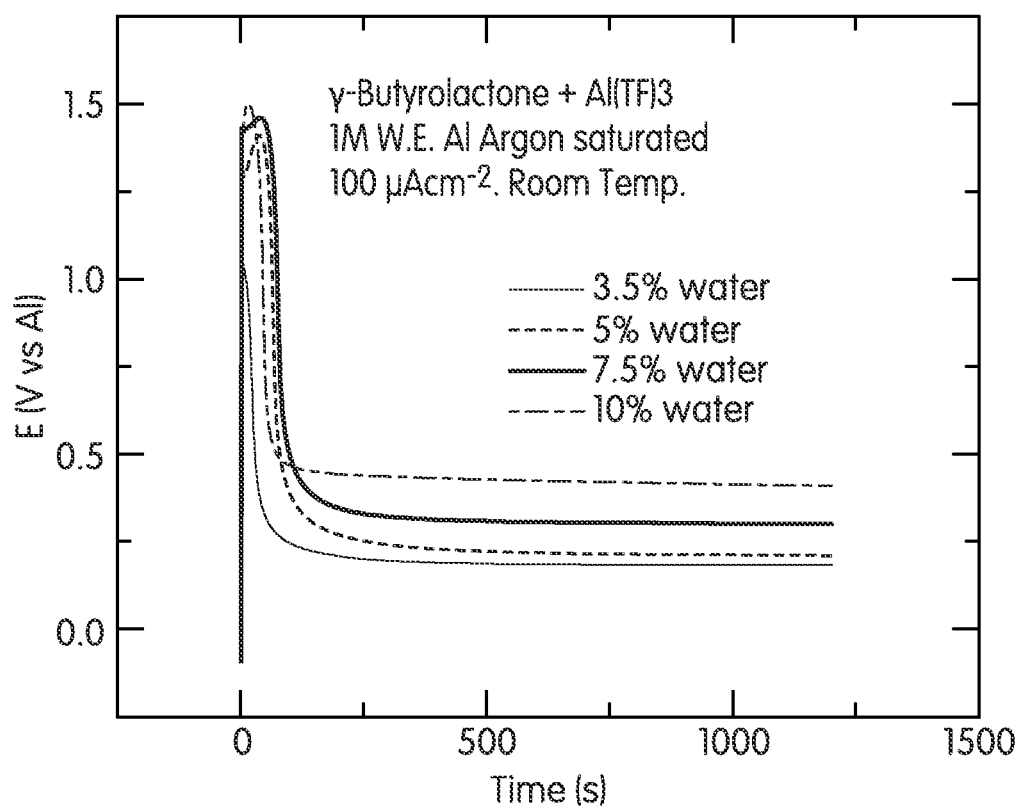
FIG. 6 shows chronopotentiograms of an aluminum electrode in γ-butyrolactone-Al(TF)$_3$ 1 M solution in one embodiment, with different concentrations of water, measured at a constant current of 100 µAcm$^{-2}$ for 1200 seconds at room temperature.
Figure 7A:
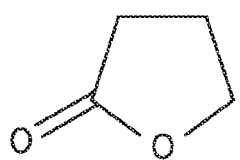
FIGS. 7$a$-7$e$ shows some exemplary γ-lactones examined for their ability to promote continuous aluminum oxidation in one embodiment: a) γ-butyrolactone, b) γ-pentanolactone, c) γ-hexanolactone, d) γ-octanolactone, and e) γ-decanolactone.
Figure 7B:
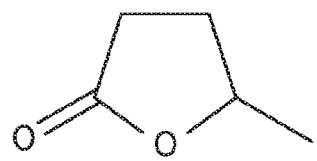
Figure 7C:
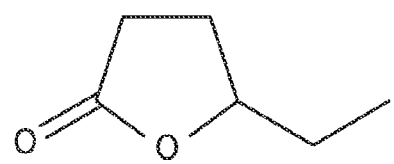
Figure 7D:
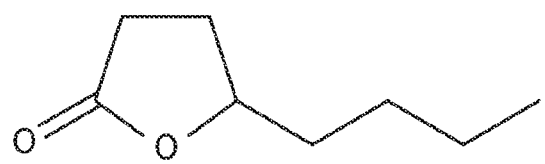
Figure 7E:

Using a fixed concentration of Al(TF)$_3$ in butyrolactone (1 M), a constant current was applied to an aluminum electrode (sanded) at water concentrations from 3.5% to 10%, as shown in FIG. 6. The chronopotentiograms show that the peak potential is dependent on the water concentration. In each of the plots the peak potential corresponding to the removal of the protective interface is still within the potential difference generating capability of the cell (i.e., between Al and O$_2$ for the electrolyte). FIGS. 15(a) through (g) show also the CPs and CVs of various systems and the influence that water concentration has on them. As shown in these figures, it is possible to obtain a continuous oxidation of aluminum at lower potential values with respect to aluminum as reference.

The effect of structural changes in the lactone on the electrochemical oxidation of aluminum was also examined. Five different lactone-based electrolyte systems—butyrolactone, pentanolactone, hexanolactone, octanolactone, and decanolactone—as shown respectively in FIGS. 7(a)-(e), were examined for their ability to promote the electrochemical oxidation of aluminum. One metric of the investigation was the effect of the size of the aliphatic chain in the γ-position on the oxidation behavior.

Figure 8:
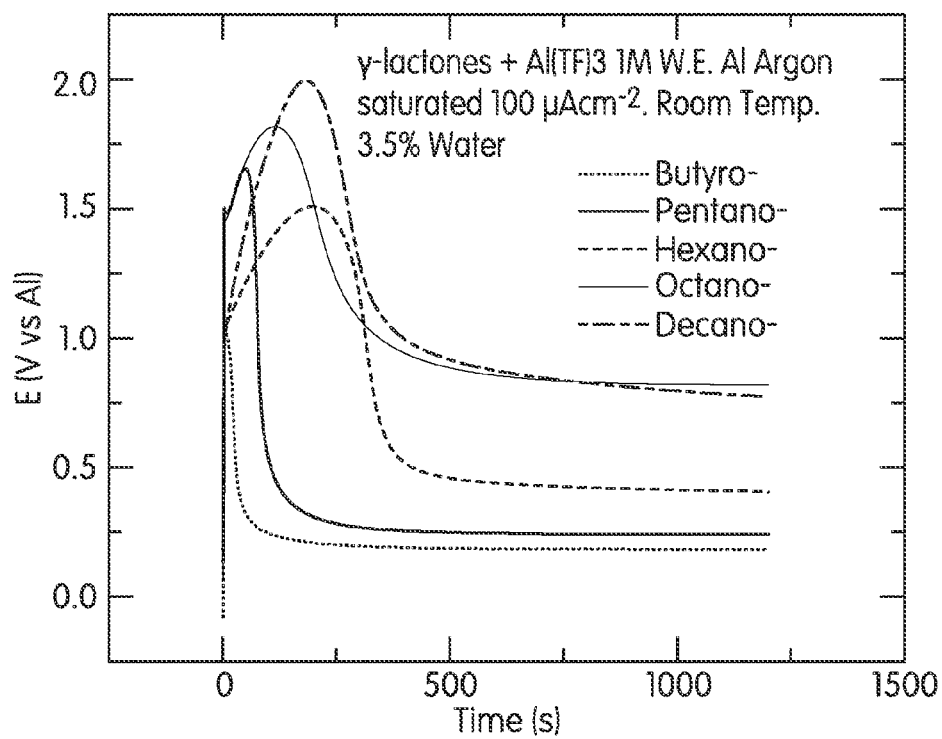
FIG. 8 shows chronopotentiograms of an aluminum electrode in different γ-lactones in one embodiment. The measurements were taken in an Al(TF)$_3$ 1 M solution, with a water concentration of 3.5%, at a constant current of 100 µAcm$^{-2}$ for 1200 seconds at room temperature.
Figure 9:
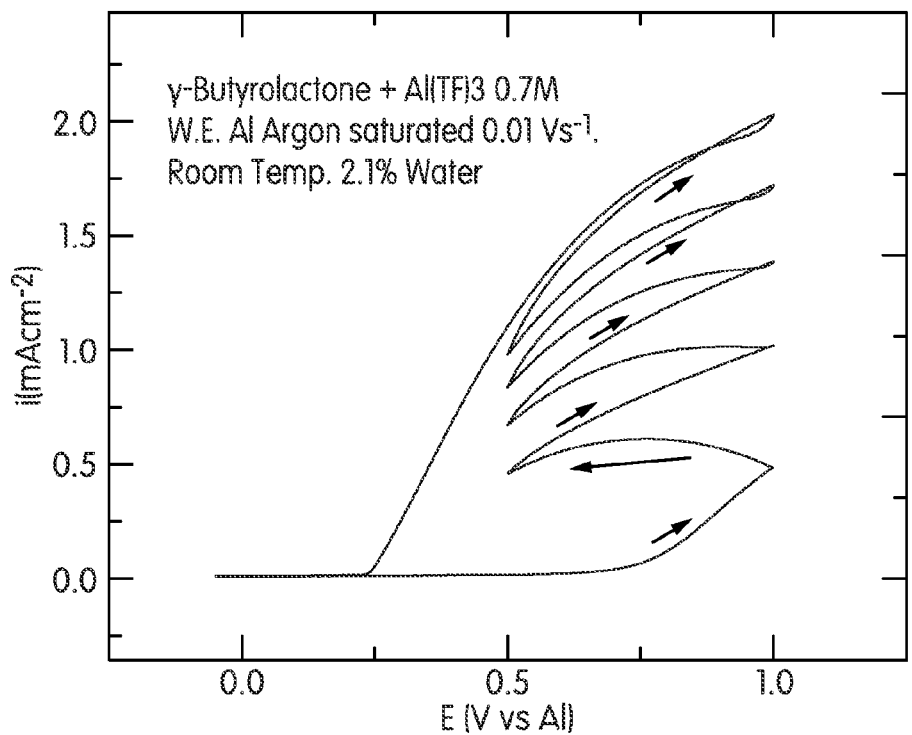
FIG. 9 shows a cyclic voltammogram of an aluminum electrode in a γ-butyrolactone-Al(TF)$_3$ 1 M solution with 2.1% water in one embodiment. No passivation is observed. The initial potential occurs at the open circuit potential (OCP), the positive limit occurs at 1 V versus Al, the second potential limit occurs at 0.5 V versus Al, and the final potential occurs at the OCP. The voltammogram was obtained at a scan rate of 0.1 Vs$^{-1}$ at room temperature.
Figure 10A:
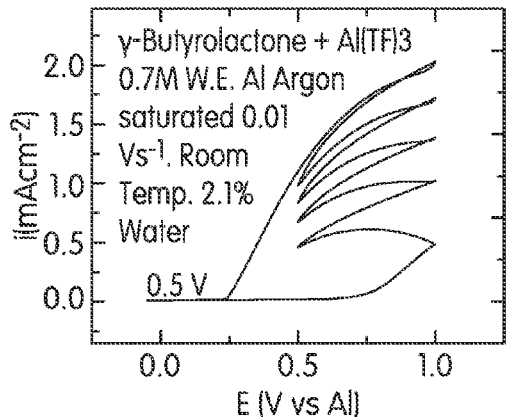
FIGS. 10$a$-10$f$ shows cyclic voltammograms of an aluminum electrode in a γ-butyrolactone-Al(TF)$_3$ 0.7 M solution with 2.1% water at potentials of a) 0.5V, b) 0.45V, c) 0.4V, d) 0.35V, e) 0.25V, and f) 0.15V. As observed in the figures, even with decreasing potentials, the electrode passivation starts at the potential where the current density reaches the zero value in the potential back-scan. The initial potential occurs at the OCP, and the positive limit at 1 V versus Al. Several second potential limits are indicated by the CV and the final potential occurs at the OCP. The voltammogram was obtained at a scan rate of 0.1 Vs$^{-1}$ at room temperature.
Figure 10B:
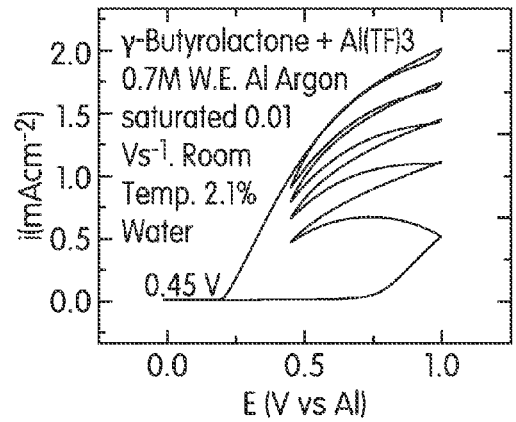
Figure 10C:
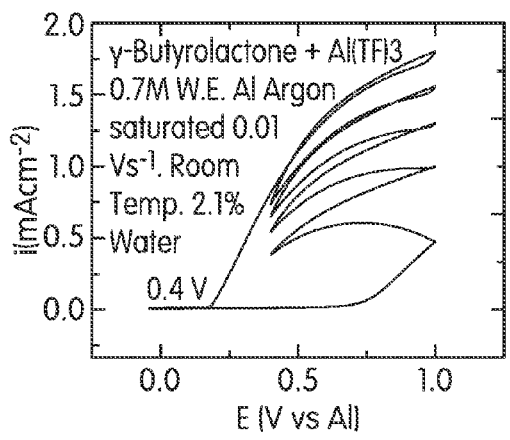
Figure 10D:
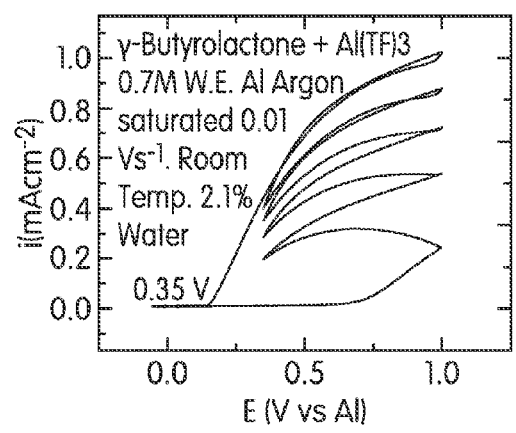
Figure 10E:
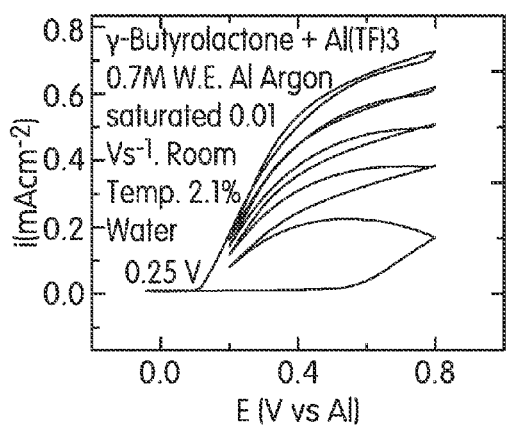
Figure 10F:
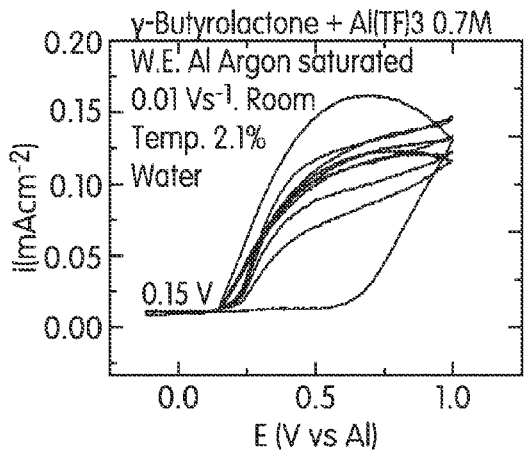

Similar volumetric behaviors were observed for all of these systems. One difference noted between the behaviors of the systems was that the decrease in current density as seen in the CVs was found to decrease with the size of the side-chain length. On the other hand, as shown in FIG. 8, at a constant current there was an increase in the final potential reached after 1200 seconds when the size of the lateral chain increased. The lower potentials were observed for γ-butyro- and γ-pentanolactone with a difference of only 60 mV between the two compounds. The difference between γ-pentano- and γ-hexanolactone was much greater (from 240 to 405 mV). However, the change is small in the larger chains (γ-octano and γ-decanolactone with 819 and 777 mV respectively). Thus, the structure of the lactone, particularly the size of the chain in the γ-position, affects the protective efficacy of the lactone.

It was observed that lactones substituted in the γ-position were less susceptible to decomposition even during the application of high currents (10 Acm$^{-2}$) for prolonged periods. The difference in protective capabilities between γ-butyro- and γ-pentanolactone is small enough to suggest that, due to its greater stability, γ-pentanolactone is a more beneficial lactone to use in the pursuit of an organic solvent that is able to promote formation of a protective interface on an aluminum electrode during charging of a cell, and remove enough of this interface so as to permit continued oxidation of the aluminum during discharging.

Further experimentation involved examination of an ionic liquid based on a lactone. The ionic liquid was made by use of α-hydroxy-γ-butyrolactone and choline hydroxide in accordance with (Eq. 1) for the synthesis of an aprotic ionic liquid.

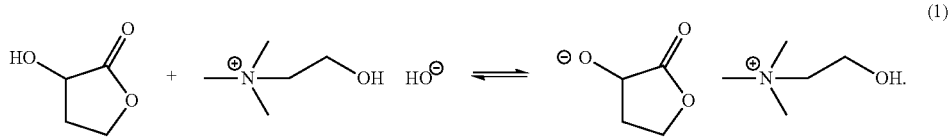

(1)

Figure 11A:
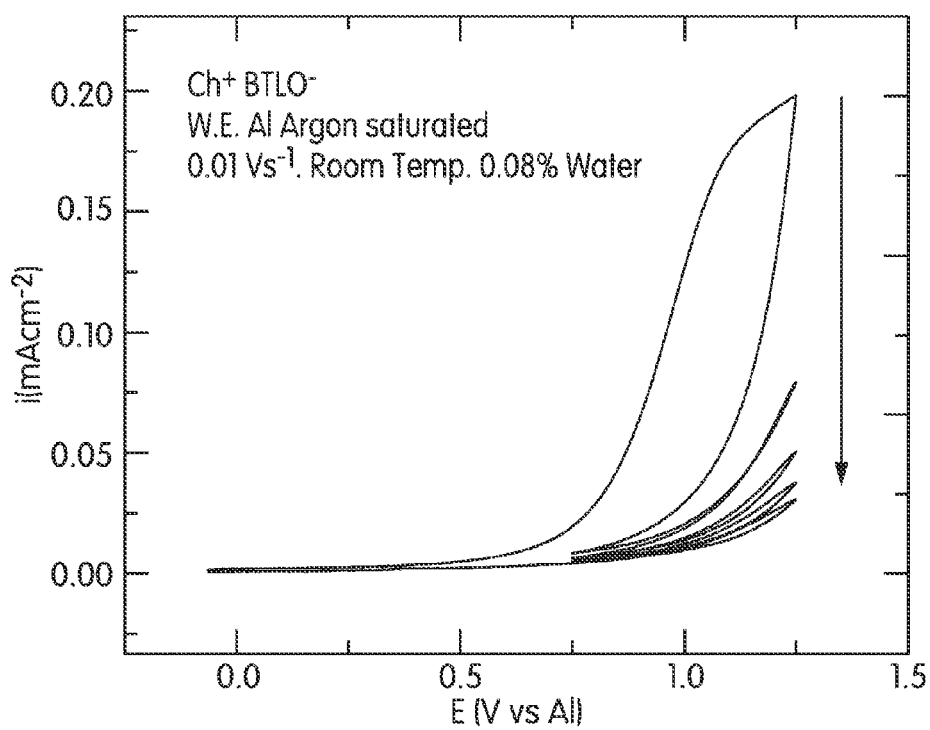
FIG. 11$a$-11$b$ shows a) a cyclic voltammogram and b) a chronopotentiogram of an aluminum electrode in a γ-butyrolactone-α-O$^-$ choline solution with 0.08% water in one embodiment. The CV was obtained at a scan rate of 0.01 Vs$^{-1}$ and the CP was obtained at a constant current of 100 µAcm$^{-2}$ for 1200 seconds. Both the CV and the CP were taken at room temperature.
Figure 11B:
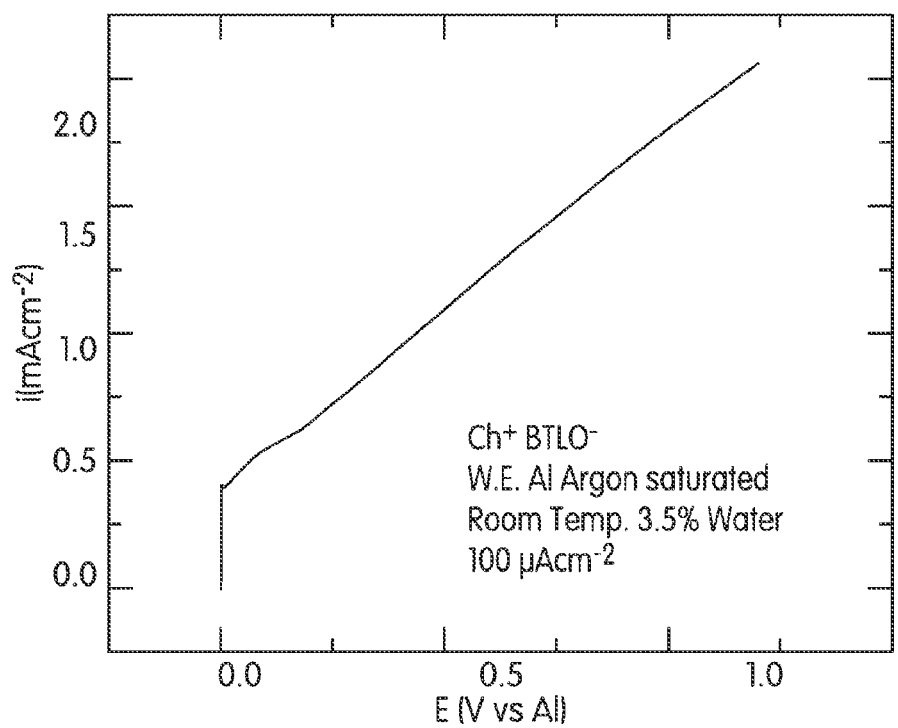
Figure 12:
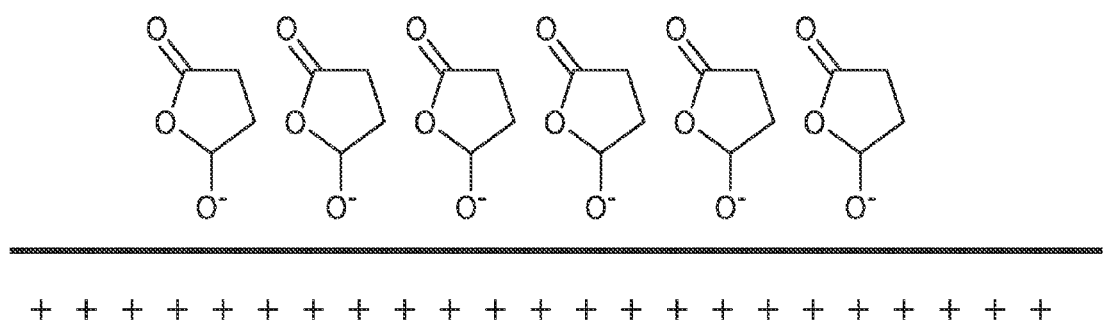
FIG. 12 provides a graphical representation of a possible orientation of γ-butyrolactone-α-O$^-$ over the positive charge anode surface.
Figure 16A:
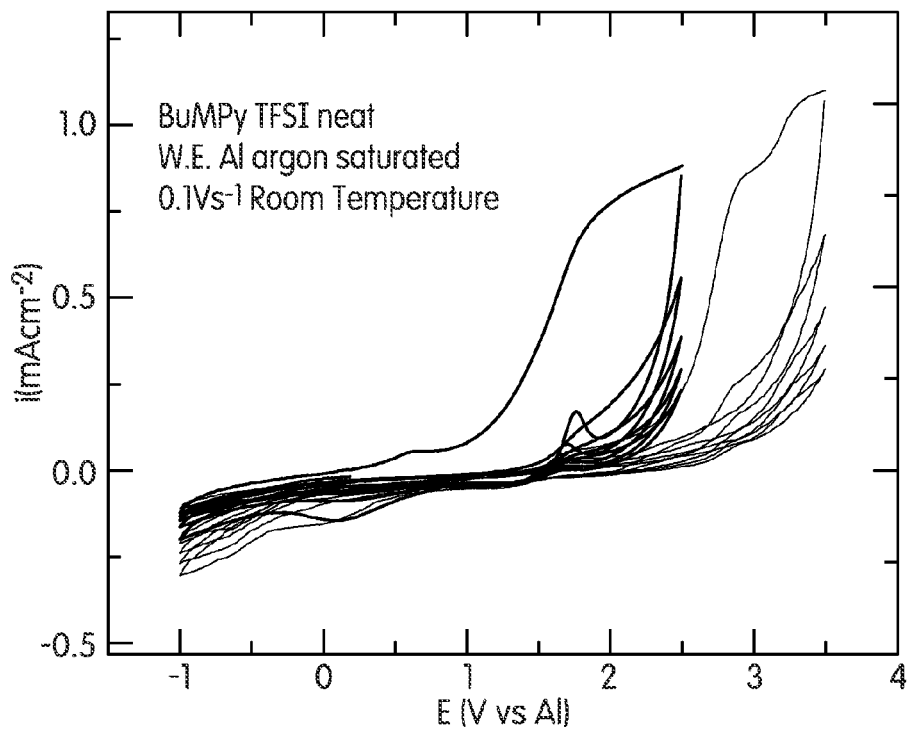
FIGS. 16a-16b shows a) a cyclic voltammogram and b) a chronopotentiogram of an aluminum electrode in neat butyl methylpyrrolidinium bis(trifluoromethanesulfonyl)imide (BuMPy TFSI) in one embodiment. The voltammogram was obtained at a scan rate of 0.1 Vs$^{-1}$ at room temperature. The chronopotentiogram was obtained at a constant current of 150 µAcm$^{-2}$ for 1200 seconds at room temperature.
Figure 16B:
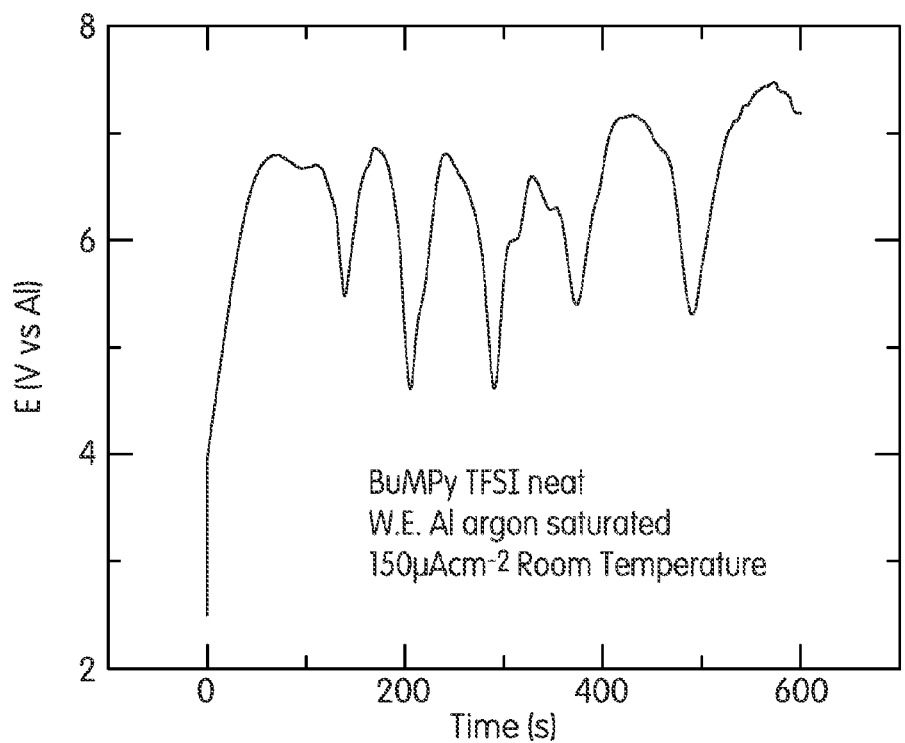
Figure 17A:
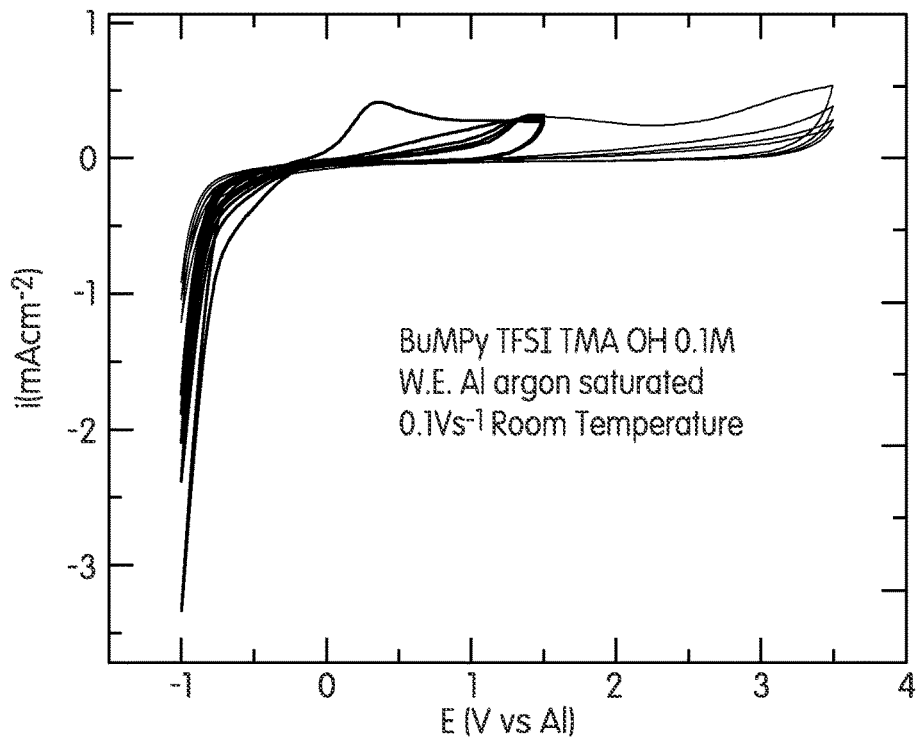
FIGS. 17a-17b shows a) a cyclic voltammogram and b) a chronopotentiogram of an aluminum electrode in a neat butyl methylpyrrolidinium bis(trifluoromethanesulfonyl) imide trimethylammonium hydroxide (BuMPy TFSI TMAOH) 0.1 M solution in one embodiment. The voltammogram was obtained at a scan rate of 0.1 Vs$^{-1}$ at room temperature. The chronopotentiogram was obtained at a constant current of 150 µAcm$^{-2}$ for 1200 seconds at room temperature.
Figure 17B:
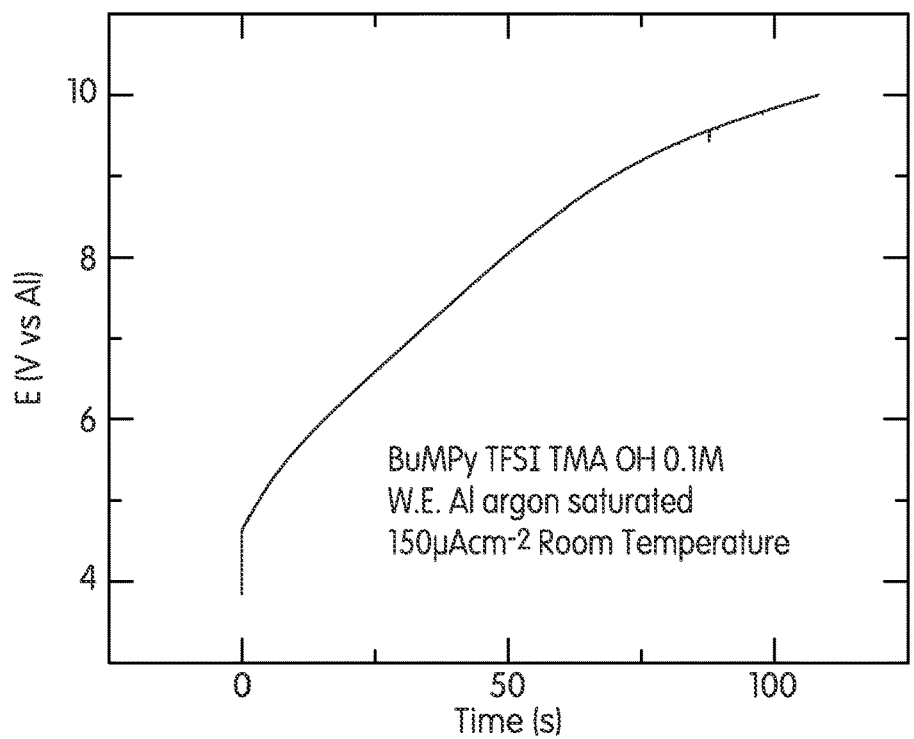
Figure 18A:
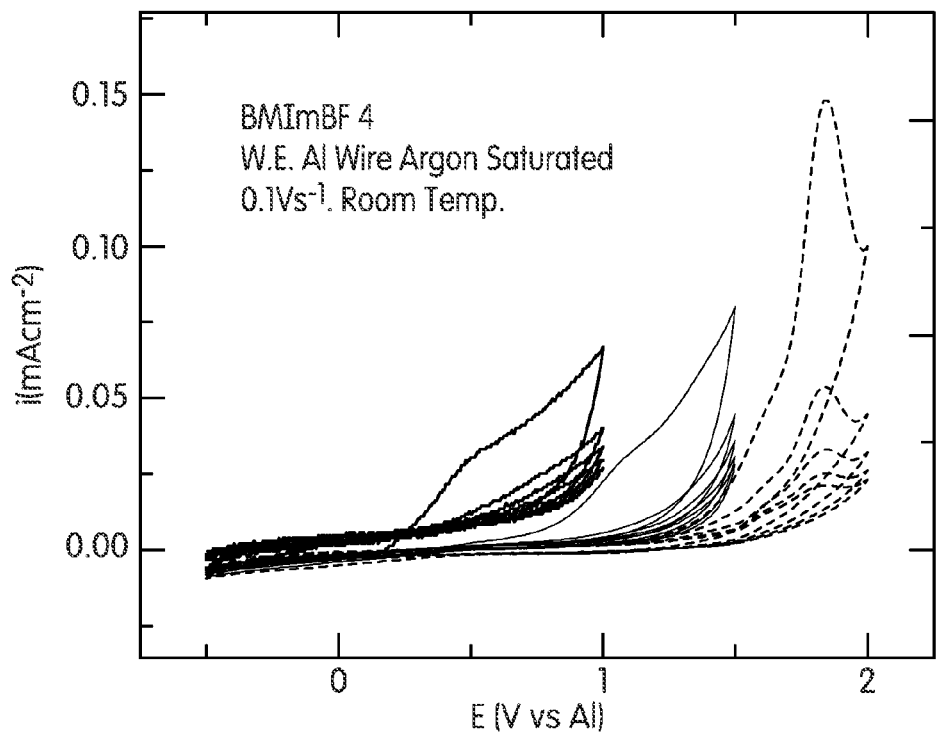
FIGS. 18a-18b shows cyclic voltammograms of an aluminum electrode in a) butylmethylimidazolium BF4 ionic liquid and b) sulfolane-aluminum triflate at a ratio of 10:1 in one embodiment. The voltammogram in FIG. 18a was obtained at a scan rate of 0.1 Vs$^{-1}$ at room temperature and the voltammogram in FIG. 18b was obtained at a scan rate of 0.01 Vs$^{-1}$ at 110° C.
Figure 18B:
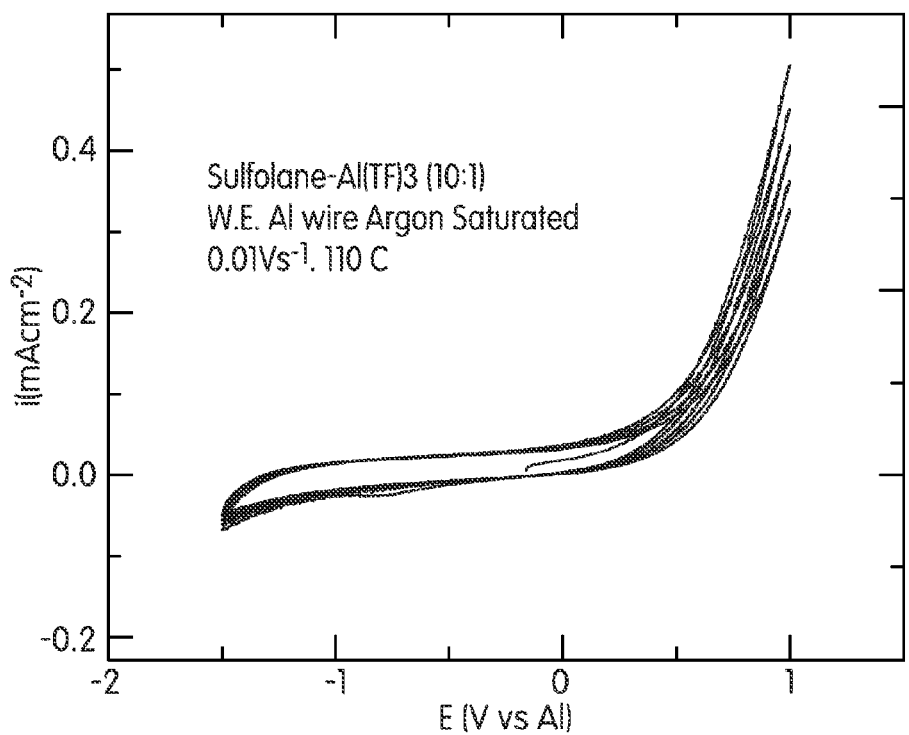

The use of this ionic liquid for the electrochemical oxidation of aluminum results in rapid passivation of the aluminum surface during cyclic voltammetry, as shown in FIG. 11(a), even at low water concentrations (0.08% by Karl-Fisher). With the application of a constant current, the same phenomenon is observed, that is, the potential increases at a constant rate and no evidence of any protective effect from the solvent is detected. Not to be bound by any particular theory, but this effect can possibly be attributed to the orientation of the lactone ring. FIG. 12 depicts a possible configuration of the molecule orientation with respect to a positively charged surface. The negative charge in the alpha-position can rotate the molecule and position the ether-carboxy fraction away from the electrode surface. This suggests that the protective properties of lactones are related to a specific absorption or adsorption of the molecule that positions the O—C=O section so that it faces the aluminum surface. FIGS. 16(a) and (b), 17(a) and (b), and 18(a) and (b) show results of different solvent systems—BuMPy TFSI, BuMPy TFSI TMAOH, and butylmethylimidazolium BF4, respectively—and their interactions with aluminum electrodes. These results provide guidance in selecting electrolyte system candidates.

Figure 13A:
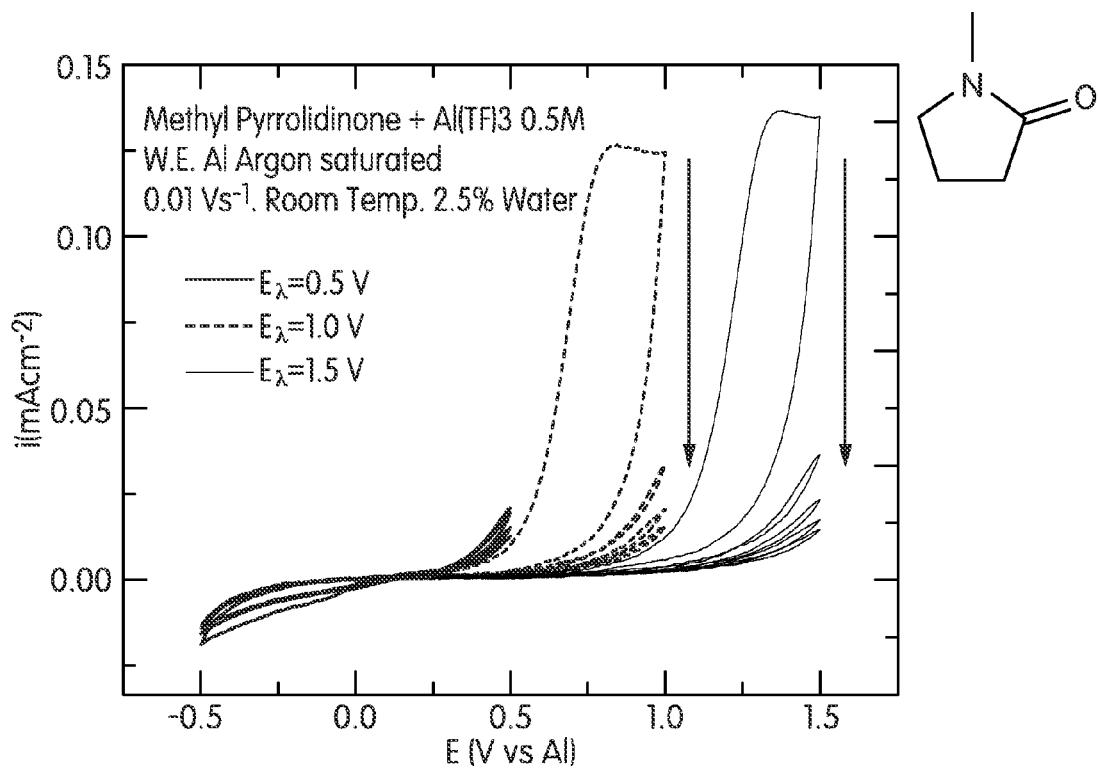
FIGS. 13$a$-13$b$ shows a) a cyclic voltammogram and b) a chronopotentiogram of an aluminum electrode in a pyrrolidinone-Al(TF)$_3$ 0.5 M solution in one embodiment. The CV was obtained at a scan rate of 0.01 Vs$^{-1}$ and the CP was obtained at a constant current of 100 µAcm$^{-2}$ for 1200 seconds. Both the CV and the CP were taken at room temperature.
Figure 13B:
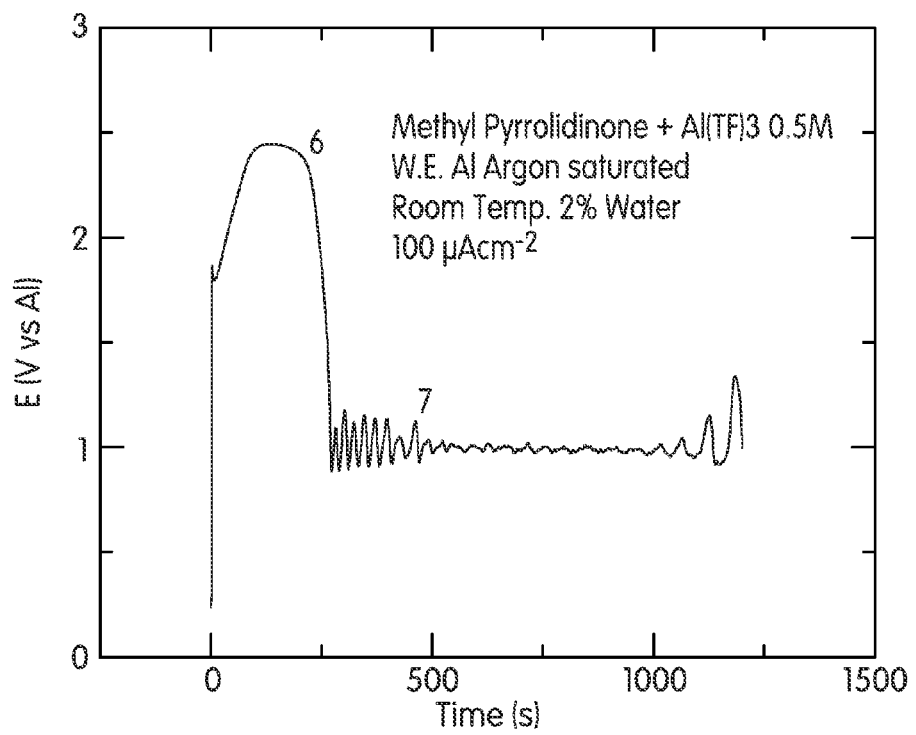
Figure 14:
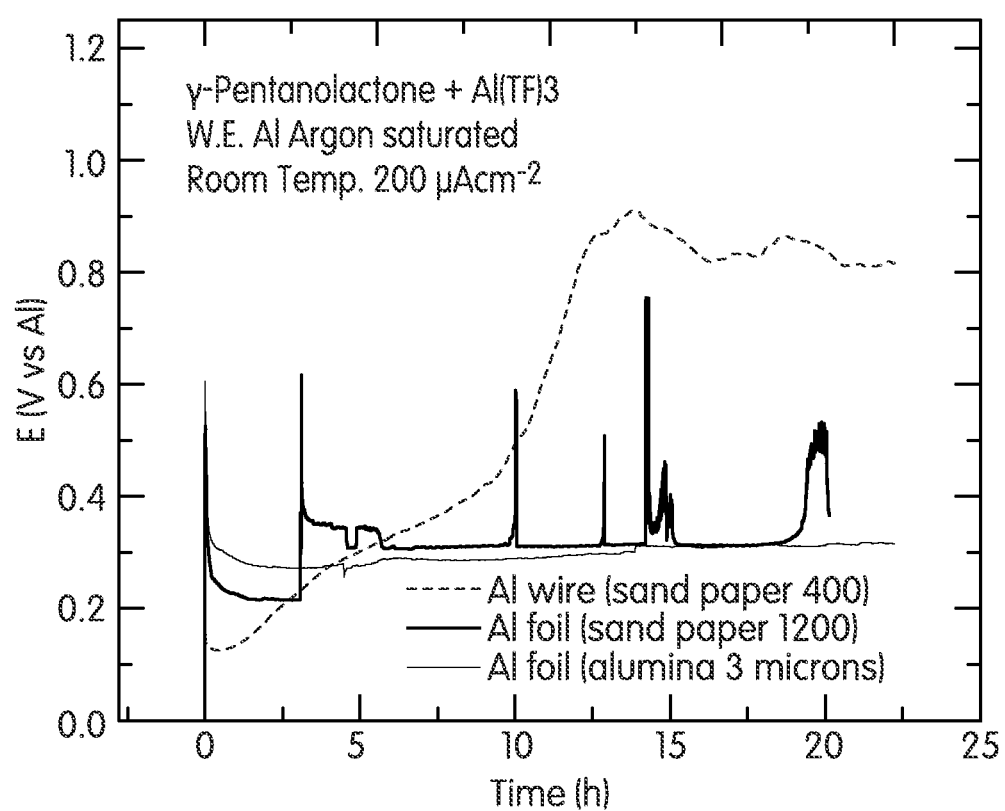
FIG. 14 shows chronopotentiograms of an aluminum electrode in a γ-pentanolactone-AR(TF)$_3$ 1 M solution at various aluminum surface conditions in one embodiment. The curves represent data acquired with an aluminum wire sanded with 400-grit (black) and 1200-grit (red) sandpaper, and an aluminum foil polished with 3 micron alumina (blue). The CPs were obtained at a constant current of 200 µAcm$^{-2}$ for 20 hours at room temperature.
Figure 15A:
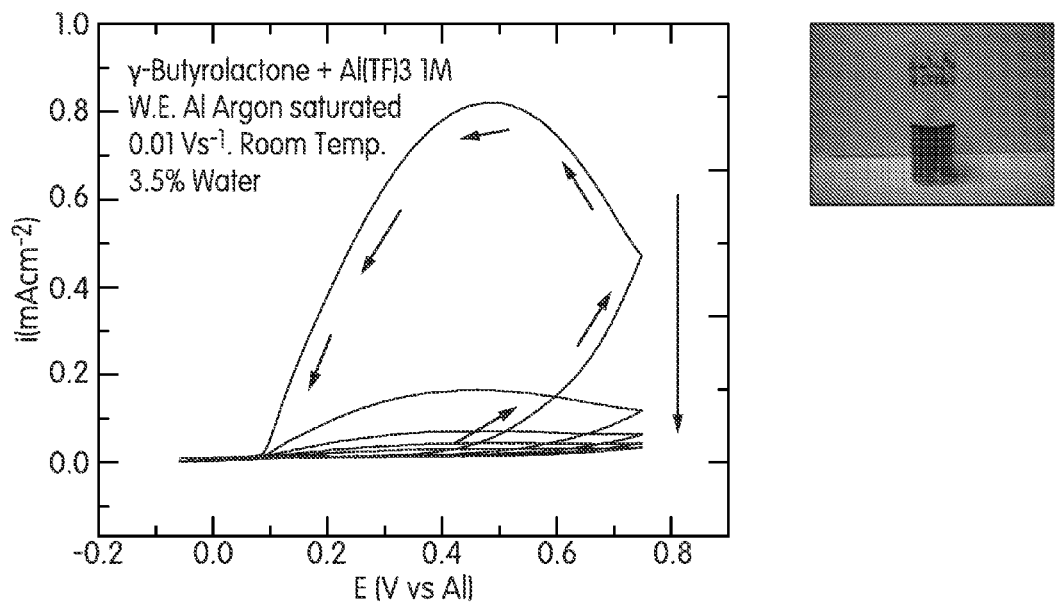
FIGS. 15a-15g.
Figure 15B:
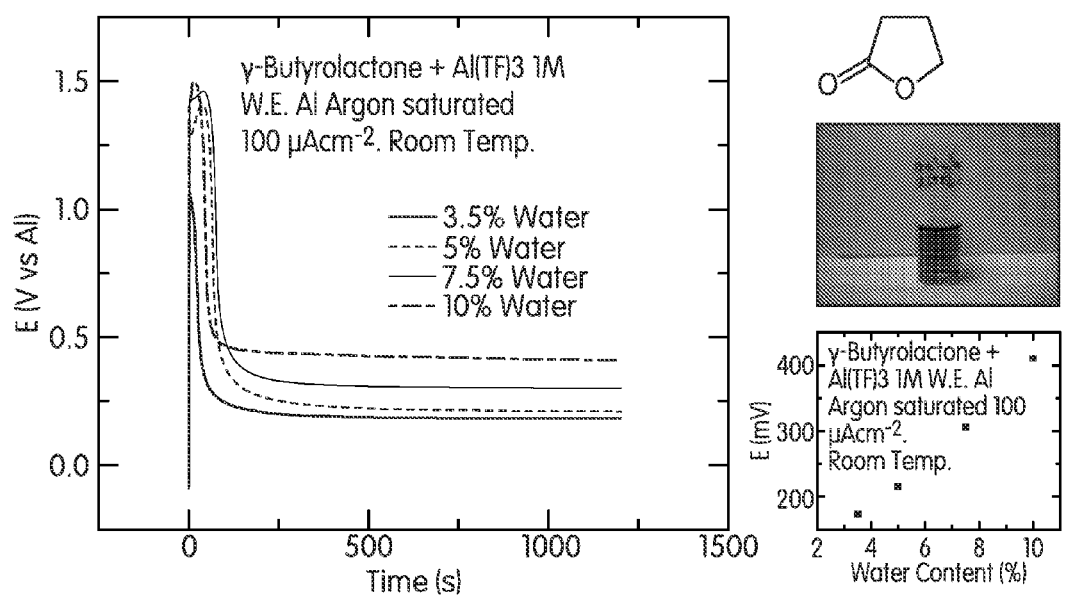
Figure 15C:
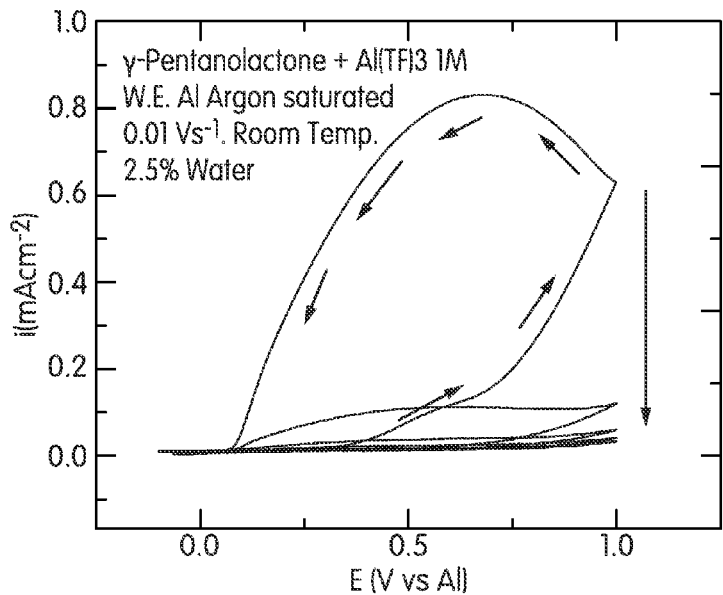
Figure 15C:
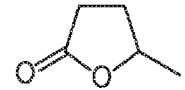
Figure 15D:
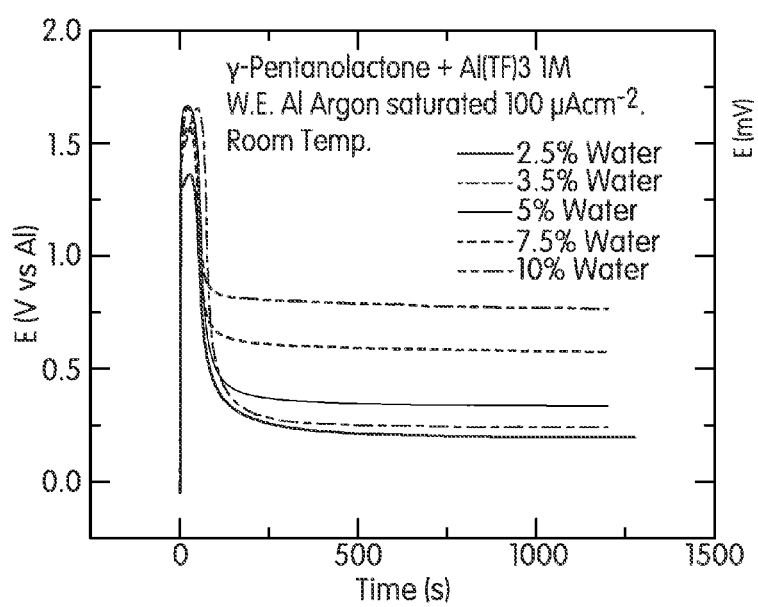
Figure 15D:
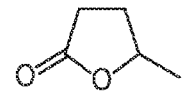
Figure 15E:
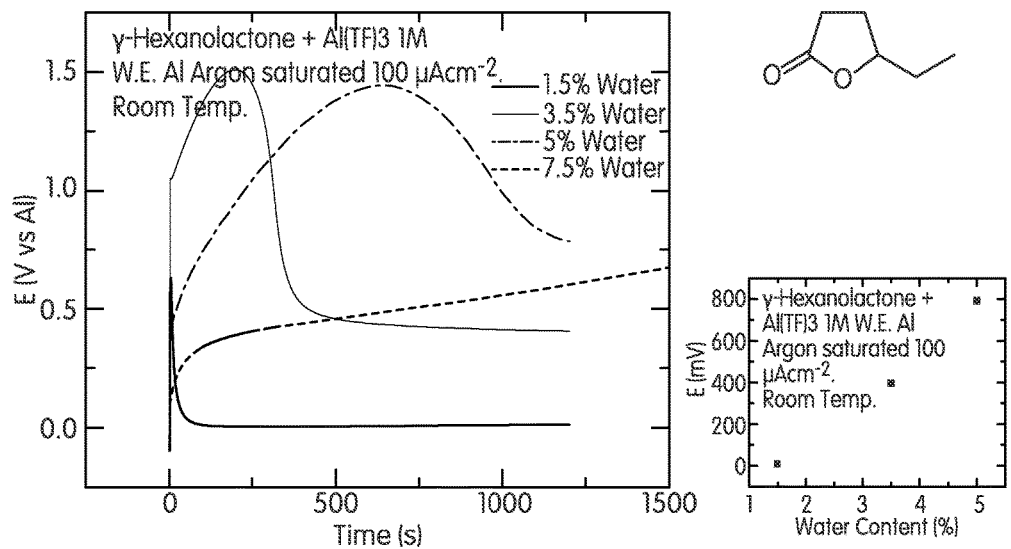
Figure 15F:
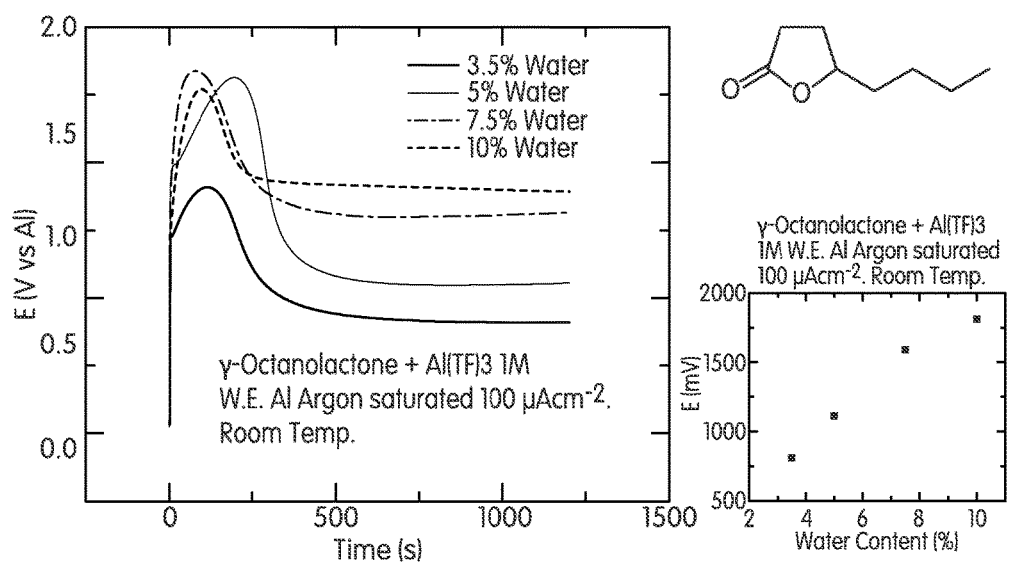
Figure 15G:
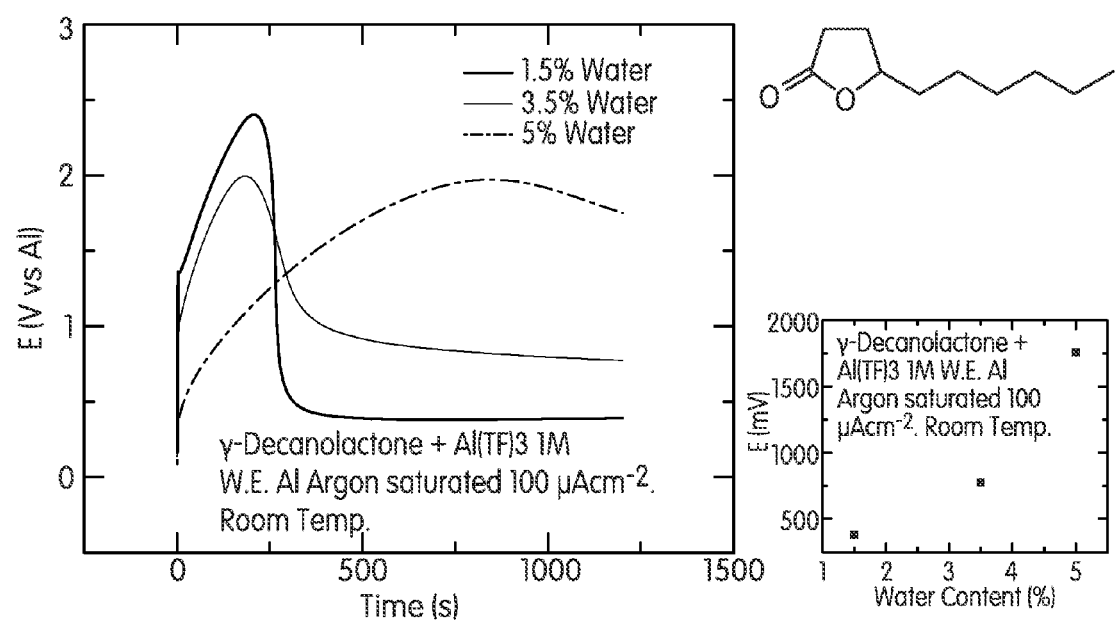

Pyrrolidinone, which has a similar molecular structure to lactone, may also be used in the cell. Pyrrolidinone also has a five-member ring, with a C=O fraction and nitrogen instead of —O— ether. The combination of this solvent and $Al(TF)_3$ shows an electrochemical behavior similar to general aluminum passivation, as shown in FIGS. 13(a) and (b). During CV experiments, the increase in the potential window resulted in a constant passivation of the electrode, and this was only reversible by physical removal (i.e., scratching). However, the chronoamperometric experiment shows a depassivation step (signal 6, FIG. 13(b)) where, after reaching a peak potential, the passivation layer was removed and the potential decreased at a level corresponding to the oscillating signal 7. Not to be bound by any particular theory, but the oscillating signals 7 are believed to be caused by a balance between the rate of formation of the passivating layer and the rate at which this layer is removed. The average potential of this oscillating signal is similar to the potential obtained with γ-octano- and γ-decanolactone.

Irreversible passivation of aluminum can be prevented by using organic solvents, such as lactones, during non-use of the cell, and that the protective interface that is formed may be removed by a potential that is within the discharge capability of the cell. Particularly desirable candidates are butyrolactone and pentanolactone. The Figures show various testing and benefits showing characteristics of different compositions proposed for use within the electrochemical cell.

The aluminum chemistry and the ionically conductive media are preferably air- and water-stable, and the ionically conductive medium performs one or more of the various functions. Under open-circuit conditions, it may form a nearly perfect passivating film at the aluminum/electrolyte interface. Under polarization or discharge conditions, the passivating film "lites off" (i.e. removes under electrochemical action) at low overpotential and allows sustained faradaic aluminum oxidation to occur. The medium may solvates or complexes aluminum ions such that faradaic oxidation results in etching of the aluminum interface as opposed to formation of an anodic oxide film. Also, upon going from an anodic polarization condition to an open-circuit condition, rapidly re-forms the passivating film to prevent self-discharge.

The articles "a" and "an" are used herein to refer to one or more than one (i.e., to at least one) of the grammatical object of the article. Any ranges cited herein are inclusive. The terms "substantially" and "about" used throughout this Specification are used to describe and account for small fluctuations. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

What is claimed:

1. An electrochemical cell comprising:
   (i) a plurality of electrodes, comprising a fuel electrode that comprises aluminum as the fuel and an air electrode that absorbs gaseous oxygen, the electrodes being operable in a discharge mode to create an aluminum-oxygen redox couple wherein the aluminum is oxidized at the fuel electrode and oxygen is reduced at the air electrode, and
   (ii) an ionically conductive medium, comprising an organic solvent, wherein the organic solvent comprises a pentanolactone and a metal salt dissolved therein, the ionically conductive medium being essentially free of chloride ions;
   wherein the organic solvent promotes formation of a protective interface between the aluminum of the fuel electrode and the ionically conductive medium during non-use of the cell and
   wherein at an onset of the discharge mode, at least some of the protective interface is removed from the aluminum within the potential difference between the fuel and air electrodes to thereafter permit continued oxidation of the aluminum during the discharge mode.

2. The electrochemical cell of claim 1, wherein the cell is a primary cell.

3. The electrochemical cell of claim 1, wherein the cell is exposed to ambient air.

4. The electrochemical cell of claim 1, wherein the fuel electrode consists essentially of aluminum.

5. The electrochemical cell of claim 1, wherein the air electrode is porous.

6. The electrochemical cell of claim 1, wherein the ionically conductive medium further comprises water.

7. The electrochemical cell of claim 1, wherein the ionically conductive medium further comprises water at less than or equal to about 10 wt %.

8. The electrochemical cell of claim 1, wherein the ionically conductive medium comprises at least 3.5 wt % water.

9. The electrochemical cell of claim 1, wherein the metal salt in the ionically conductive medium comprises a metal triflate.

10. The electrochemical cell of claim 1, wherein the metal salt in the ionically conductive medium comprises an aluminum triflate, sodium triflate, a copper triflate, or combinations thereof.

11. The electrochemical cell of claim 1, wherein the metal salt in the ionically conductive medium comprises a metal triflate dissolved in the organic solvent at a concentration that is less than or equal to about 1 M.

12. The electrochemical cell of claim 1, wherein the ionically conductive medium comprises an ionic liquid.

13. The electrochemical cell of claim 1, wherein the ionically conductive medium comprises an ionic liquid based on the organic solvent.

14. The electrochemical cell of claim 1, wherein the ionically conductive medium comprises an ionic liquid based on the pentanolactone.

15. The electrochemical cell of claim 13, wherein the ionic liquid is hydrophobic.

16. The electrochemical cell of claim 13, wherein the ionic liquid is aprotic.

17. The electrochemical cell of claim 1, wherein the ionically conductive medium further comprises a hygroscopic additive.

18. The electrochemical cell of claim 1, wherein the ionically conductive medium comprises at least one species that affects the formation of the protective interface with respect to a rate of the formation, a form of the protective interface formed, or both.

19. The electrochemical cell of claim 1, wherein the ionically conductive medium comprises at least one species that decreases an electrochemical overpotential needed to initiate and continuously support the oxidation of the aluminum in the presence of water, gaseous oxygen, or both, during the discharge mode.

20. The electrochemical cell of claim 1, wherein during non-use of the cell, the protective interface inhibits the oxidation of the aluminum by anions present in the ionically conductive medium.

21. The electrochemical cell of claim 1, wherein the ionically conductive medium comprises hydroxide ions.

22. The electrochemical cell of claim 1, wherein the formation is by chemisorption, physisorption, complexation, hydrogen bonding, ionic reaction, or combinations thereof.

23. The electrochemical cell of claim 1, wherein the cell is operable at room temperature.

24. A method of making a metal-air electrochemical cell, comprising a fuel electrode that comprises aluminum as the fuel and an air electrode that absorbs gaseous oxygen, the fuel electrode and the air electrode being operable in a discharge mode to create an aluminum-oxygen redox couple wherein the aluminum is oxidized at the fuel electrode and oxygen is reduced at the air electrode, and an ionically conductive medium comprising an organic solvent; the method comprising:
adding the ionically conductive medium to the cell, wherein the organic solvent comprises a pentanolactone and a metal salt dissolved therein, the ionically conductive medium being essentially free of chloride ions, such that
during non-use of the cell, the organic solvent promotes formation of a protective interface between the aluminum of the fuel electrode and the ionically conductive medium, and
at an onset of the discharge mode, at least some of the protective interface is removed from the aluminum to thereafter permit oxidation of the aluminum during the discharge mode.

25. The method of claim 24, wherein the ionically conductive medium comprises an ionic liquid based on the pentanolactone.

26. The method of claim 24, wherein the metal salt in the ionically conductive medium further comprises a metal triflate.

27. The method of claim 24, wherein the metal salt in the ionically conductive medium comprises an aluminum triflate, sodium triflate, a copper triflate, or combinations thereof.

28. The method of claim 24, wherein the metal salt in the ionically conductive medium comprises a metal triflate dissolved in the organic solvent comprising the pentanolactone at a concentration that is less than or equal to about 1 M.

29. The method of claim 24, wherein the ionically conductive medium comprises an ionic liquid.

30. The method of claim 24, wherein the ionically conductive medium comprises an ionic liquid that is hydrophobic.

31. The method of claim 24, wherein the ionically conductive medium comprises an ionic liquid that is aprotic.

32. The method of claim 24, wherein the cell is exposed to ambient air.

33. The method of claim 24, wherein the protective interface is formed at room temperature.

34. The method of claim 24, wherein the ionically conductive medium comprises at least one species that affects the formation of the protective interface with respect to a rate of the formation, a form of the protective interface formed, or both.

35. The method of claim 24, wherein the ionically conductive medium comprises at least one species that decreases an electrochemical overpotential needed to initiate and continuously support the oxidation of the aluminum in the presence of water, the gaseous oxygen, or both, during the discharge mode.

36. The method of claim 24, wherein during non-use of the cell, the protective interface inhibits the oxidation of the aluminum by anions present in the ionically conductive medium.

37. The method of claim 24, wherein during the discharge mode a potential difference between the fuel electrode and the air electrode remains substantially constant.

38. The electrochemical cell of claim 1, wherein the metal salt is an aluminum salt.

39. The method of claim 24, wherein the metal salt is an aluminum salt.

* * * * *